United States Patent
Momoki et al.

(10) Patent No.: US 9,509,859 B2
(45) Date of Patent: Nov. 29, 2016

(54) IMAGE ALLOCATION DEVICE AND IMAGE ALLOCATION METHOD

(71) Applicant: FUJIFILM CORPORATION, Tokyo (JP)

(72) Inventors: Yohei Momoki, Tokyo (JP); Kei Yamaji, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 47 days.

(21) Appl. No.: 14/501,073

(22) Filed: Sep. 30, 2014

(65) Prior Publication Data

US 2015/0093034 A1  Apr. 2, 2015

(30) Foreign Application Priority Data

Sep. 30, 2013 (JP) ................. 2013-203253

(51) Int. Cl.
| | | |
|---|---|---|
| G06K 9/46 | (2006.01) | |
| H04N 1/00 | (2006.01) | |
| G06T 11/60 | (2006.01) | |
| H04N 1/32 | (2006.01) | |
| G06F 17/30 | (2006.01) | |

(52) U.S. Cl.
CPC .... *H04N 1/00196* (2013.01); *G06F 17/30247* (2013.01); *G06T 11/60* (2013.01); *H04N 1/32128* (2013.01); *H04N 2201/3232* (2013.01); *H04N 2201/3252* (2013.01)

(58) Field of Classification Search
CPC .............. H04N 1/00196; H04N 1/32128; H04N 2201/3232; H04N 2201/3252; G06F 17/30247; G06T 11/60
USPC ........................................................ 382/224
See application file for complete search history.

(56) References Cited

U.S. PATENT DOCUMENTS

| | | | | |
|---|---|---|---|---|
| 7,477,805 | B2* | 1/2009 | Ohtsuka ............ | G06F 17/30274 348/231.2 |
| 7,746,512 | B2* | 6/2010 | Yamakado ............... | G06T 11/60 345/156 |
| 8,055,080 | B2* | 11/2011 | Isomura ............... | G06F 17/3028 382/100 |
| 2004/0201752 | A1* | 10/2004 | Parulski ............... | G06F 17/3028 348/231.99 |

(Continued)

FOREIGN PATENT DOCUMENTS

| | | |
|---|---|---|
| CN | 101142595 | 3/2008 |
| JP | 2005-242604 | 9/2005 |

(Continued)

OTHER PUBLICATIONS

Chinese Office Action dated Feb. 6, 2016, with partial English translation; Application No. 201410520360.4.

(Continued)

*Primary Examiner* — Samir Ahmed
(74) *Attorney, Agent, or Firm* — Young & Thompson

(57) ABSTRACT

An image allocation device and an image allocation method are provided which are capable of calculating image characteristic quantities of a plurality of image data corresponding to a plurality of images, classifying the plurality of image data into image groups, whose number corresponds with the number of pages of display pages, based on the image characteristic quantities, and changing the sequence of the image groups according to the distances between the image groups as determined by the image characteristic quantities.

26 Claims, 20 Drawing Sheets

(56) References Cited

U.S. PATENT DOCUMENTS

| | | | |
|---|---|---|---|
| 2005/0200912 A1* | 9/2005 | Yamakado | G06T 11/60 |
| | | | 358/450 |
| 2005/0206915 A1* | 9/2005 | Uejo | G06K 15/02 |
| | | | 358/1.2 |
| 2008/0089590 A1 | 4/2008 | Isomura et al. | |
| 2008/0089592 A1* | 4/2008 | Isomura | G06T 11/60 |
| | | | 382/224 |
| 2010/0239176 A1 | 9/2010 | Yamakado et al. | |
| 2012/0321187 A1 | 12/2012 | Yamaji et al. | |

FOREIGN PATENT DOCUMENTS

| | | |
|---|---|---|
| JP | 2013-30161 | 2/2013 |
| JP | 2013-046188 | 3/2013 |

OTHER PUBLICATIONS

Chinese Office Action for Application No. 201410520360.4 dated Jul. 15, 2016, with machine English translation.

* cited by examiner

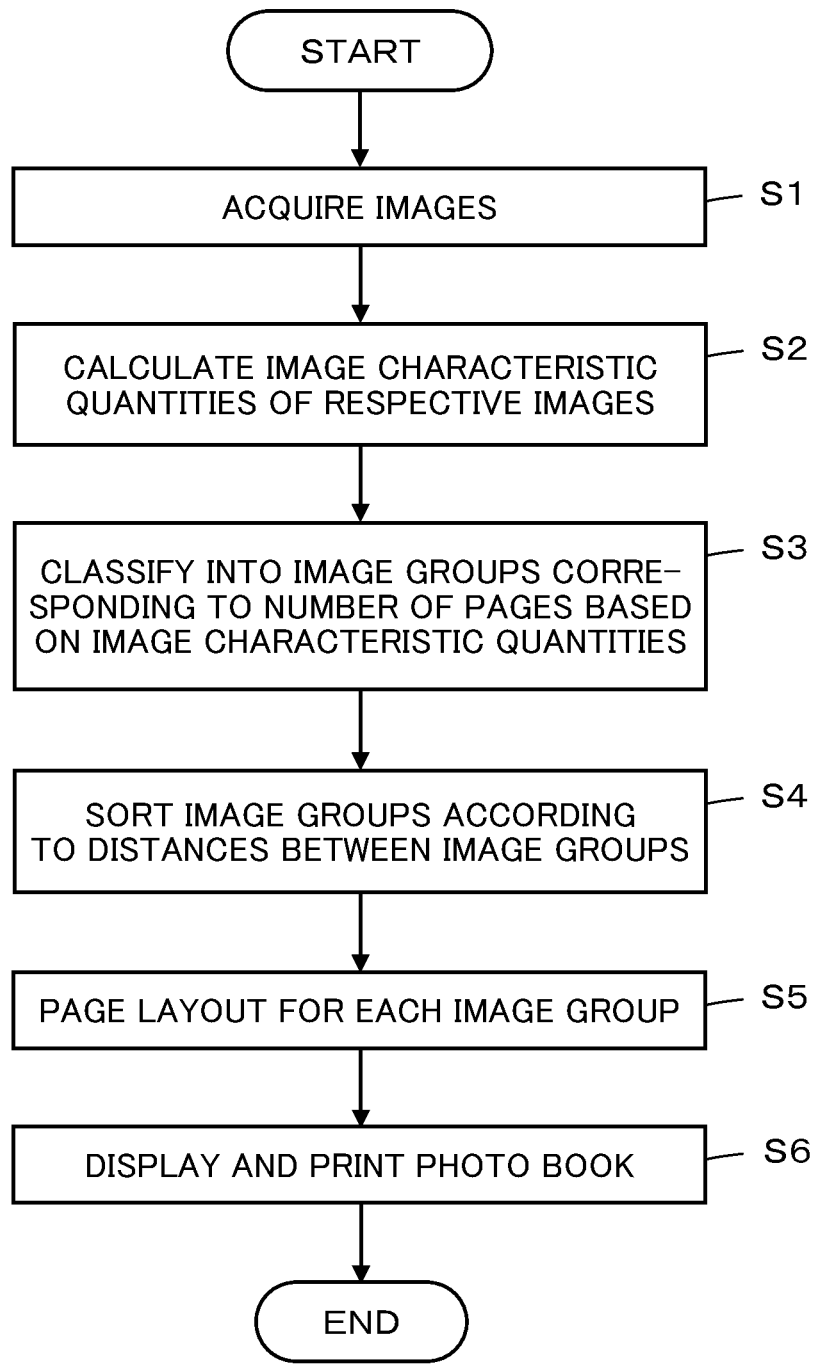

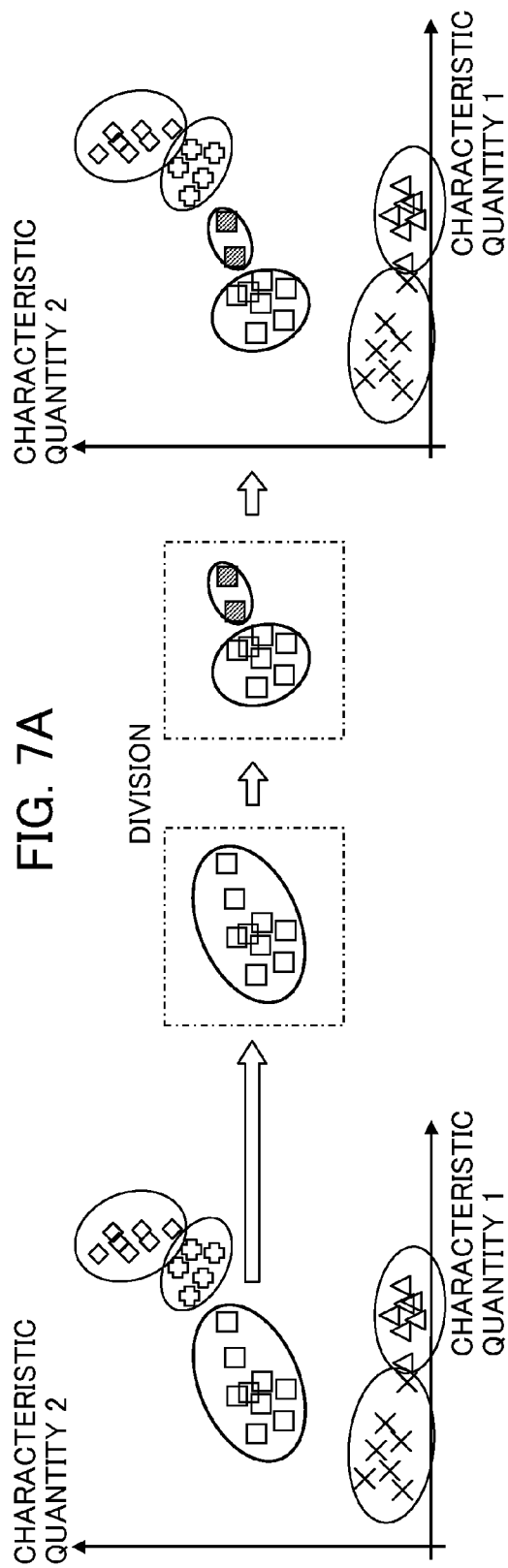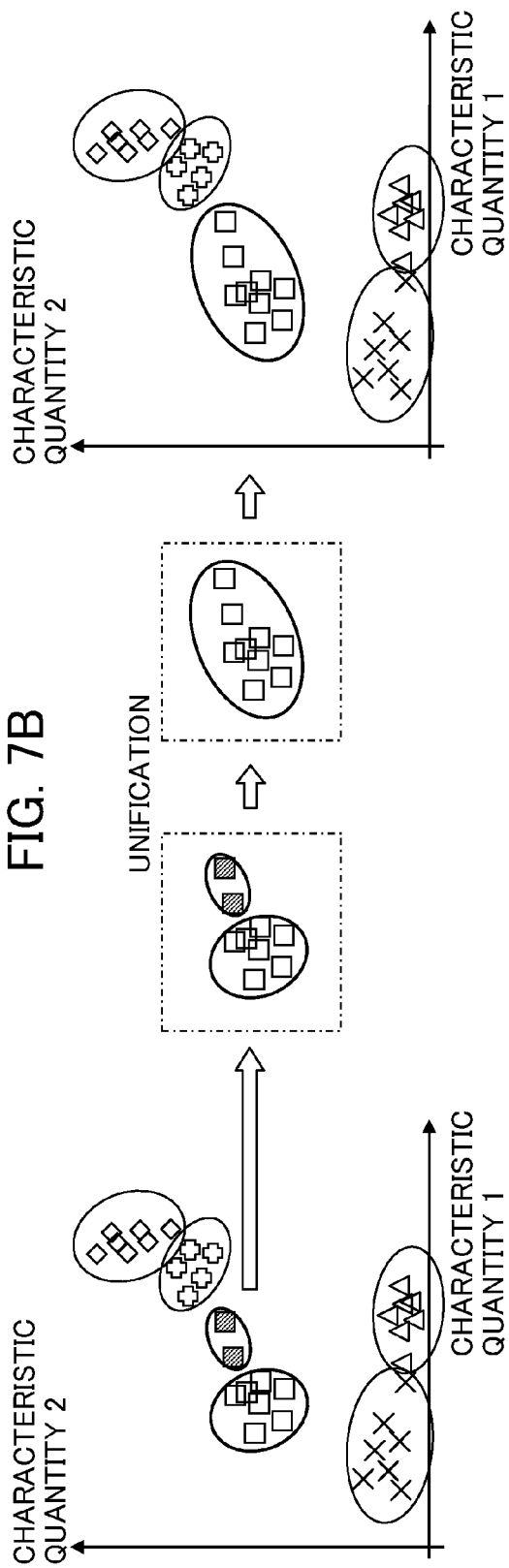

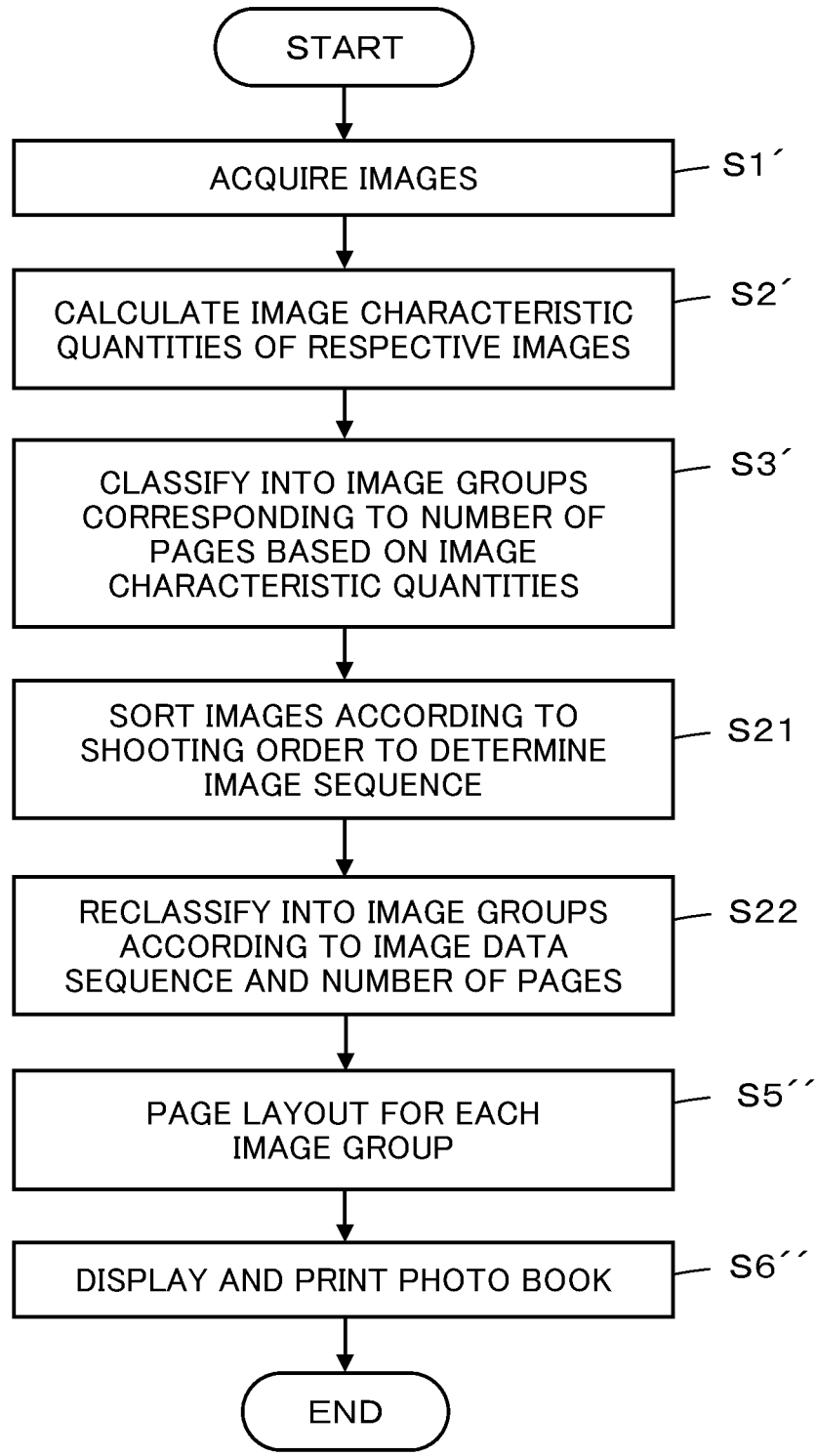

FIG. 10A
SEQUENCE →
FIG. 10B
SEQUENCE →
FIG. 10C
| ADJACENT IMAGE GROUPS | 1 | 2 | 3 | 4 | 5 | 6 | 7 | 8 | 9 | 10 |
|---|---|---|---|---|---|---|---|---|---|---|
| SIMILARITY | 0.88 | 0.15 | 0.68 | 0.44 | 0.82 | 0.17 | 0.66 | 0.41 | 0.55 | 0.80 |
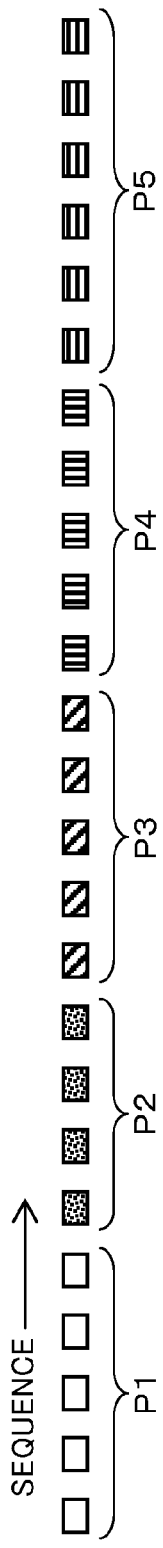
FIG. 10D
SEQUENCE →

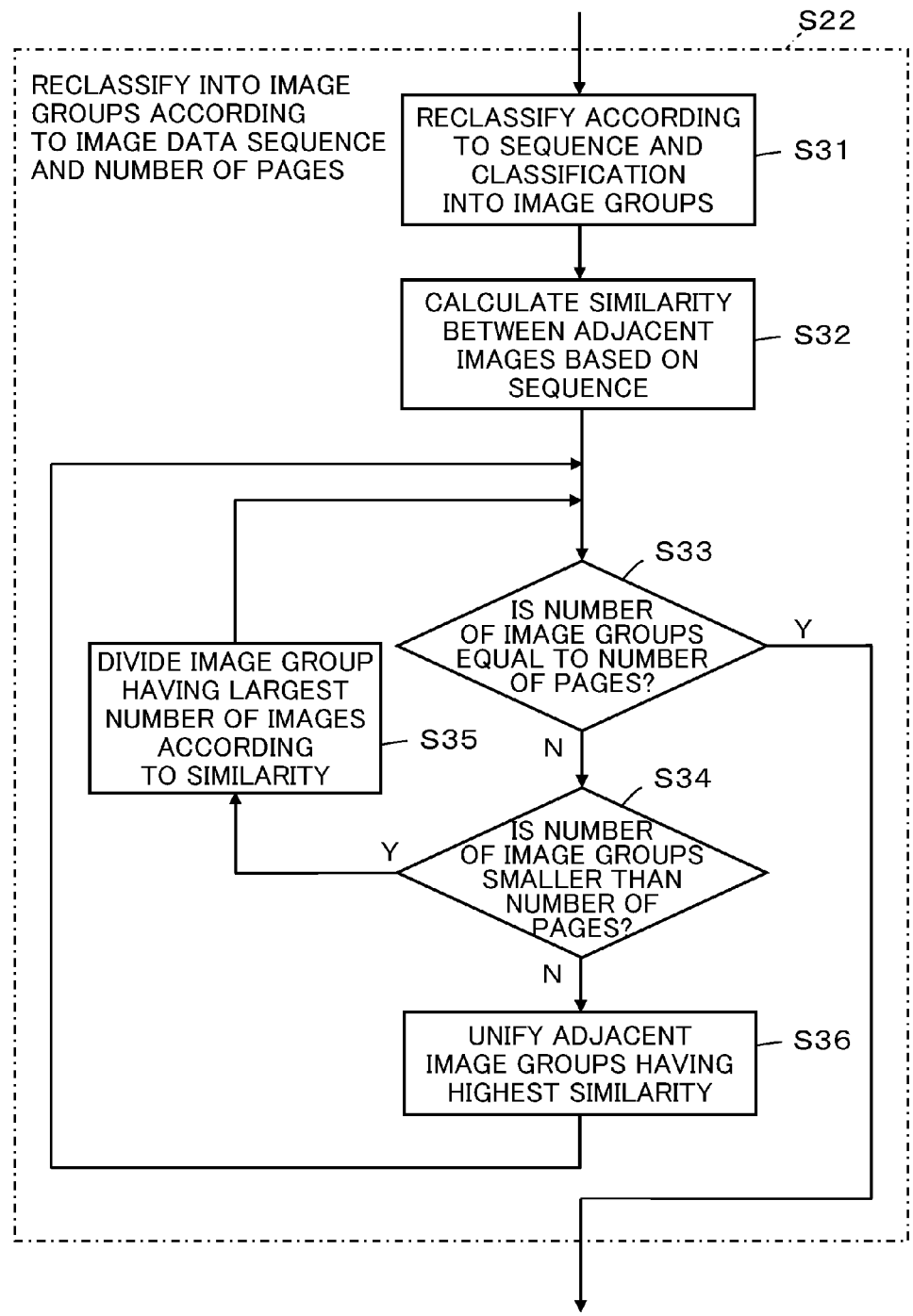

IMAGES HAVING INFORMATION ON SHOOTING DATE AND TIME

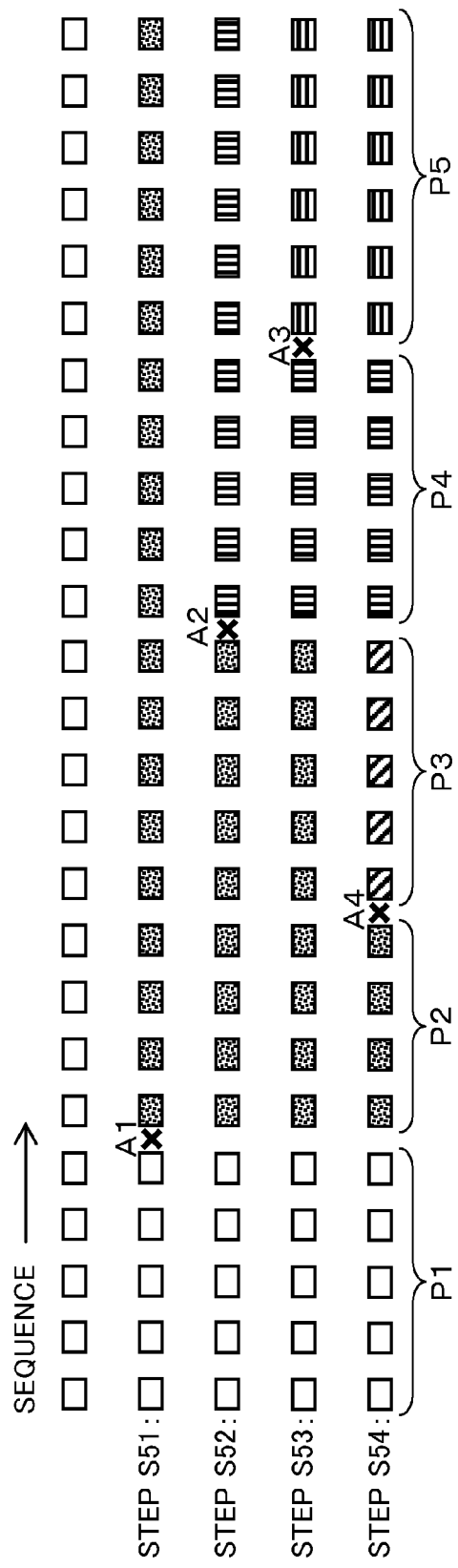

Good

Bad

Very Bad

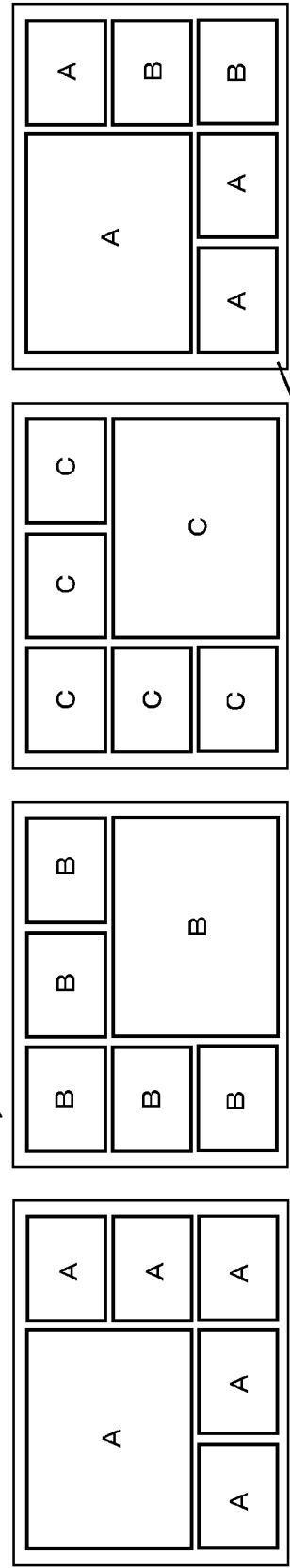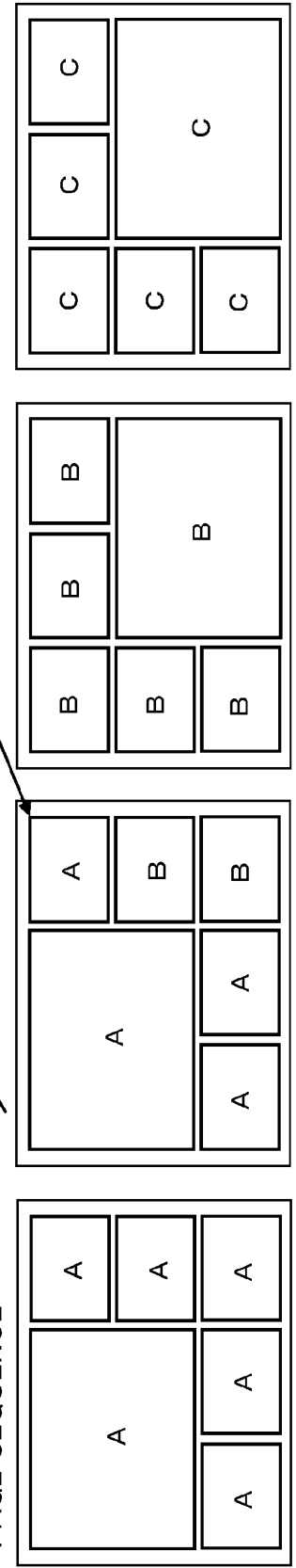
FIG. 20A Bad PAGE SEQUENCE
FIG. 20B Good PAGE SEQUENCE

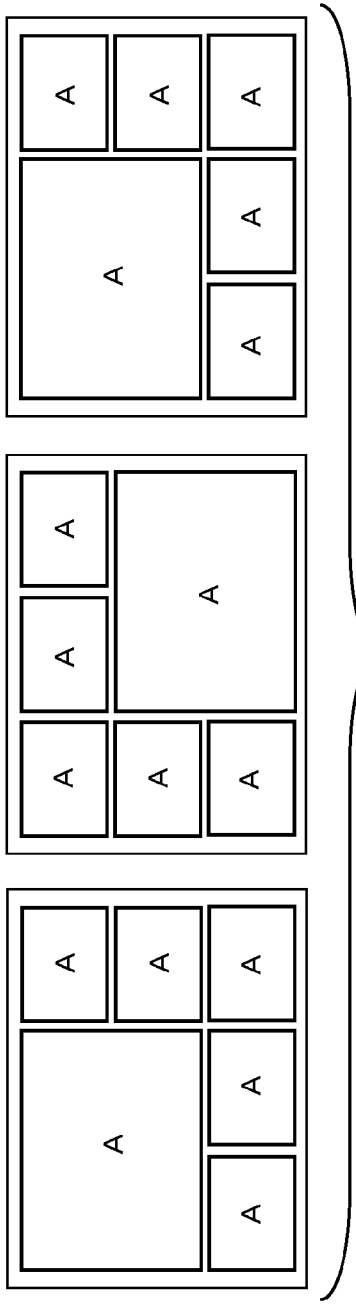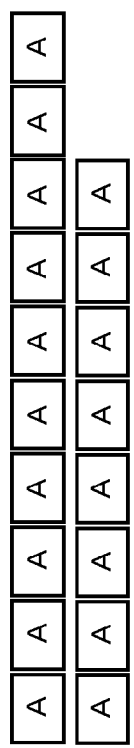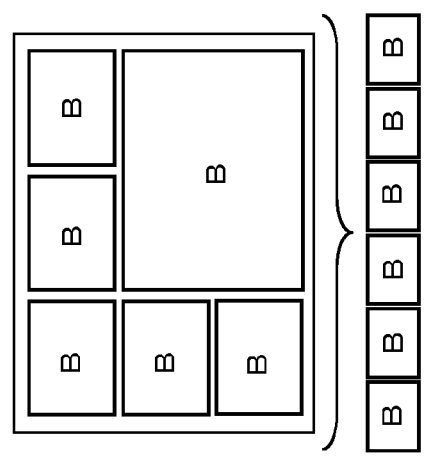
FIG. 21A GROUP A
FIG. 21B GROUP B

IMAGE ALLOCATION DEVICE AND IMAGE ALLOCATION METHOD

CROSS-REFERENCE TO RELATED APPLICATIONS

This application claims priority under 35 U.S.C. §119 to Japanese Patent Application No. 2013-203253, filed on Sep. 30, 2013, which is hereby expressly incorporated by reference, in its entirety, into the present application.

BACKGROUND OF THE INVENTION

The present invention relates to an image allocation device and an image allocation method that are used in creating a product such as a photo book based on a plurality of images.

Automatic creation of products such as a photo book and a collage has conventionally been performed by grouping a plurality of images using shooting date and time information recorded in meta-information (Exif) of image data and allocating the grouped images among display pages.

JP 2013-46188 A discloses clustering image data based on the shooting time held as metadata such as Exif and performing image layout based on clusters.

SUMMARY OF THE INVENTION

In recent years, in a social networking service (SNS) making use of images, when a user uploads image data to the SNS server, processing for deleting image meta-information such as Exif is often performed in terms of privacy protection.

Deletion of the meta-information from the image data is also accompanied by deletion of shooting information contained in the meta-information and hence the images cannot be discriminated based on the shooting date and time. If a photo book is to be created using these images which cannot be discriminated based on the shooting date and time, the images are arranged out of order and a photo book having a desired layout cannot be created unless the user changes the layout while checking the images one by one.

In order to perform a desired layout in creating a photo book, the following three conditions are important: I. "an image group should properly be divided," II. "an image group should be allocated to adjacent pages as much as possible even if not properly divided," and III. "a balance should be struck between the number of images in an image group and the number of display pages."

Condition I, "an image group should properly be divided," means that one display page is to be only composed of images of a single image group as shown with Image group A and Image group B of FIG. 19A, without arranging images of more than one image group on one display page as shown with Image group A and Image group B of FIG. 19B or arranging one image group and in particular similar images therein over adjacent pages, as is the case with Image group B of FIG. 19C.

Condition II, "an image group should be allocated to adjacent pages as much as possible even if not properly divided," means that an image group is to be prevented from being displayed on discontiguous pages as shown with Image group A and Image group B of FIG. 20A, and to be allocated to adjacent pages as much as possible as shown with Image group A and Image group B of FIG. 20B.

Condition III, "a balance should be struck between the number of images in an image group and the number of display pages," means that Image group A including a larger number of images is to be allocated to a larger number of pages and Image group B including a smaller number of images is to be allocated to a smaller number of pages, as shown in FIGS. 21A and 21B.

The present invention aims at providing an image allocation device and an image allocation method capable of classifying a plurality of images into a plurality of image groups and sorting the image groups regardless of whether there is shooting information so that the above-described conditions I to III are satisfied.

In order to achieve the above-described object, the present invention provides an image allocation device configured to allocate images to be displayed among display pages based on classification into image groups, comprising:

an image group classifier configured to classify a plurality of image data having image characteristic quantities into the image groups, whose number corresponds with a number of pages of the display pages, based on the image characteristic quantities; and an image group sorter configured to change a sequence of the image groups according to distances between the image groups, with the distances being determined by the image characteristic quantities.

Preferably, the image allocation device further comprises an image characteristic quantity calculator configured to individually calculate the image characteristic quantities of the plurality of image data.

Preferably, the image allocation device further comprises a page number changer configured to change the number of pages.

Preferably, in a case where the number of pages is increased in the page number changer, the image group classifier divides the image groups sequentially in descending order of number of images in an image group until the number of the image groups corresponds with a changed number of pages, and in a case where the number of pages is decreased in the page number changer, the image group classifier sequentially unifies the image groups such that an image group having a smallest number of images and an image group closest to the image group having the smallest number of images are unified into one image group, until the number of the image groups corresponds with a changed number of pages.

Preferably, in a case where the number of pages is changed in the page number changer, the image group classifier reclassifies the plurality of image data into image groups, whose number corresponds with a changed number of pages, based on the image characteristic quantities.

Further, the present invention provides an image allocation device configured to allocate images to be displayed among display pages based on classification into image groups, comprising:

an image group classifier configured to classify a plurality of image data having image characteristic quantities into the image groups, whose number corresponds with a number of pages of the display pages, based on the image characteristic quantities; and a sequence determiner configured to determine a sequence of the plurality of image data based on shooting information that the plurality of image data have, wherein the image group classifier reclassifies the plurality of image data into the image groups, whose number corresponds with the number of pages of the display pages, based on the image characteristic quantities, the classification into the image groups, and the sequence of the plurality of image data.

Preferably, the image allocation device further comprises an image characteristic quantity calculator configured to individually calculate the image characteristic quantities of the plurality of image data.

Preferably, the image allocation device further comprises a page number changer configured to change the number of pages.

Preferably, the image group classifier calculates inter-image similarity between adjacent image data based on the image characteristic quantities and the sequence, and reclassifies the plurality of image data into the image groups, whose number corresponds with the number of pages of the display pages, based on the inter-image similarity.

Preferably, the image group classifier calculates inter-image similarity between adjacent image data based on the image characteristic quantities and the sequence, and calculates a recommended number of pages of the display pages based on the inter-image similarity.

Preferably, the image group classifier classifies the plurality of image data into a plurality of new image groups based on the classification into the image groups and the sequence, calculates inter-image similarity between adjacent images based on the image characteristic quantities and the sequence, and performs unification or division of the plurality of new image groups based on the inter-image similarity to reclassify the plurality of image data into the image groups whose number corresponds with the number of pages of the display pages.

Preferably, the image allocation device further comprises a shooting information discriminator, wherein the shooting information discriminator discriminates the plurality of image data into image data having the shooting information and image data not having the shooting information.

Preferably, in a case where the shooting information discriminator determines that a number of images of the image data not having the shooting information is larger by at least a predetermined number than a number of images of the image data having the shooting information, the image group classifier classifies the image data having the shooting information and the image data not having the shooting information into a plurality of image groups without distinction, and in a case where the shooting information discriminator determines that the number of images of the image data having the shooting information is larger by at least a predetermined number than the number of images of the image data not having the shooting information, or that a difference between the number of images of the image data having the shooting information and the number of images of the image data not having the shooting information is within a predetermined range, the image group classifier classifies the image data having the shooting information into a plurality of image groups and adds the image data not having the shooting information to one or more out of the plurality of image groups of the image data having the shooting information based on the image characteristic quantities.

Preferably, the image allocation device further comprises a classification selector, wherein the classification selector selects either performing the classification into the image groups taking the shooting information into account or performing the classification into the image groups based on the image characteristic quantities, in a case where the classification into the image groups is performed taking the shooting information into account, the image group classifier classifies the plurality of image data into the image groups after discrimination of the plurality of image data by the shooting information discriminator, and in a case where the classification into the image groups is performed based on the image characteristic quantities, the image group classifier classifies the plurality of image data into the image groups without discrimination of the plurality of image data by the shooting information discriminator.

Preferably, the shooting information includes shooting date and time information or shooting order information.

Further, the present invention provides an image allocation method for allocating images to be displayed among display pages based on classification into image groups, comprising:

classifying a plurality of image data having image characteristic quantities into the image groups, whose number corresponds with a number of pages of the display pages, based on the image characteristic quantities; and changing a sequence of the image groups according to distances between the image groups, with the distances being determined by the image characteristic quantities.

Preferably, the image characteristic quantities of the plurality of image data are individually calculated before the classification into the image groups.

Preferably, the image allocation method further comprises changing the number of pages, the classification into the image groups is performed based on a changed number of pages.

Preferably, in a case where the number of pages is increased, the image groups are divided sequentially in descending order of number of images in an image group until the number of the image groups corresponds with a changed number of pages, and in a case where the number of pages is decreased, the image groups are sequentially unified such that an image group having a smallest number of images and an image group closest to the image group having the smallest number of images are unified into one image group, until the number of the image groups corresponds with a changed number of pages.

Preferably, in a case where the number of pages is changed, the plurality of image data are reclassified into image groups, whose number corresponds with a changed number of pages, based on the image characteristic quantities.

Further, the present invention provides an image allocation method for allocating images to be displayed among display pages based on classification into image groups, comprising:

classifying a plurality of image data having image characteristic quantities into the image groups, whose number corresponds with a number of pages of the display pages, based on the image characteristic quantities;

determining a sequence of the plurality of image data based on shooting information that the plurality of image data have; and reclassifying the plurality of image data into the image groups, whose number corresponds with the number of pages of the display pages, based on the image characteristic quantities, the classification into the image groups, and the sequence of the plurality of image data.

Preferably, the image characteristic quantities of the plurality of image data are individually calculated before the classification into the image groups.

Preferably, the image allocation method further comprises changing the number of pages, wherein the classification into the image groups is performed based on a changed number of pages.

Preferably, inter-image similarity between adjacent image data is calculated based on the image characteristic quantities and the sequence, and the plurality of image data are reclassified into the image groups, whose number corresponds with the number of pages of the display pages, based on the inter-image similarity.

Preferably, inter-image similarity between adjacent image data is calculated based on the image characteristic quantities and the sequence, and a recommended number of pages of the display pages is calculated based on the inter-image similarity.

Preferably, the plurality of image data are classified into a plurality of new image groups based on the classification into the image groups and the sequence, inter-image similarity between adjacent image data is calculated based on the image characteristic quantities and the sequence, and unification or division of the plurality of new image groups is performed based on the inter-image similarity to reclassify the plurality of image data into the image groups whose number corresponds with the number of pages of the display pages.

Preferably, the plurality of image data are discriminated into image data having the shooting information and image data not having the shooting information.

Preferably, in a case where a number of images of the image data not having the shooting information is larger by at least a predetermined number than a number of images of the image data having the shooting information, the image data having the shooting information and the image data not having the shooting information are classified into a plurality of image groups without distinction, and in a case where the number of images of the image data having the shooting information is larger by at least a predetermined number than the number of images of the image data not having the shooting information, or in a case where a difference between the number of images of the image data having the shooting information and the number of images of the image data not having the shooting information is within a predetermined range, the image data having the shooting information are classified into a plurality of image groups and the image data not having the shooting information are added to one or more out of the plurality of image groups of the image data having the shooting information based on the image characteristic quantities.

Preferably, the image allocation method further comprises selecting either performing the classification into the image groups taking the shooting information into account or performing the classification into the image groups based on the image characteristic quantities, wherein, in a case where the classification into the image groups is performed taking the shooting information into account, the plurality of image data are classified into the image groups after discrimination of the plurality of image data, and wherein, in a case where the classification into the image groups is performed based on the image characteristic quantities, the plurality of image data are classified into the image groups without the discrimination of the plurality of image data.

Preferably, the shooting information includes shooting date and time information or shooting order information.

The present invention is capable of classifying a plurality of images into a plurality of image groups and sorting the image groups so that the above-described conditions I to III are satisfied. Accordingly, it is possible to create a product such as a photo book having a desired layout performed based on desired image groups.

BRIEF DESCRIPTION OF THE DRAWINGS

FIG. 2 is a flow chart showing a photo book creation flow in the photo book creation apparatus of FIG. 1.

FIG. 7A is an explanatory diagram illustrating a case where an image group is divided into two image groups in the image allocation device of FIG. 1; and FIG. 7B is an explanatory diagram illustrating a case where two image groups are unified into one.

FIG. 9 is a flow chart showing a photo book creation flow in the photo book creation apparatus of FIG. 8.

FIGS. 10A to 10D are explanatory diagrams illustrating reclassification into image groups in the photo book creation flow of FIG. 9.

FIG. 11 is a flow chart showing a detailed flow of Step S22 in the photo book creation flow of FIG. 9.

FIG. 16 is an explanatory diagram illustrating a calculation method in a case where the recommended number of pages in a photo book to be created is calculated in the image allocation device of the invention.

FIGS. 20A and 20B are each an explanatory diagram illustrating a relationship between display pages in a photo book and the sequence of image groups.

FIGS. 21A and 21B are each an explanatory diagram illustrating a relationship between the number of display pages in a photo book and the number of images in an image group.

DETAILED DESCRIPTION OF THE INVENTION

An image allocation device according to the present invention is described below in detail with reference to preferred embodiments shown in the accompanying drawings.

Embodiment 1

Figure 1:
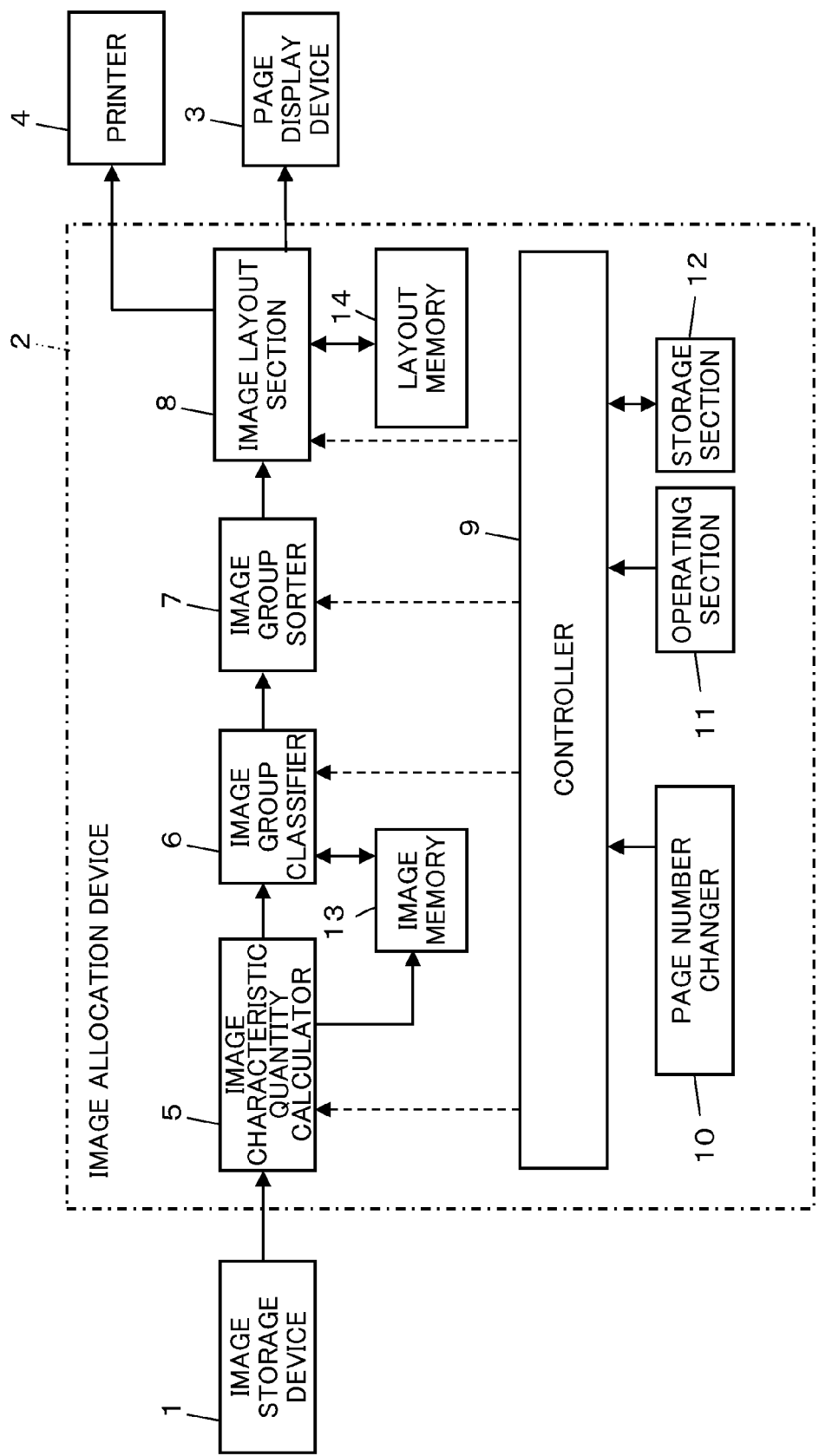
FIG. 1 is a block diagram showing a configuration of a photo book creation apparatus provided with an image allocation device according to Embodiment 1 of the invention.

FIG. 1 is a block diagram showing a configuration of a photo book creation apparatus provided with an image allocation device according to Embodiment 1 of the invention. As shown in FIG. 1, the photo book creation apparatus includes an image storage device 1, the image allocation device 2 connected to the image storage device 1, and a page display device 3 and a printer 4 which are both connected to the image allocation device 2.

The image storage device 1 stores a plurality of images as image data and may be composed of, for example, a recording medium such as a hard disk, a flexible disk, an MO, an MT, a RAM, a CD-ROM or a DVD-ROM, and an instrument for reading out from them. The image storage device 1 may be composed of a server on the Internet or the like.

The image allocation device 2 is provided with an image characteristic quantity calculator 5, an image group classifier 6, an image group sorter 7 and an image layout section 8 which are sequentially connected between the image storage device 1 and the page display device 3 or the printer 4, a controller 9 connected to each of the image characteristic quantity calculator 5, the image group classifier 6, the image group sorter 7 and the image layout section 8, as well as a page number changer 10, an operating section 11 and a storage section 12 connected to the controller 9. The image allocation device 2 is also provided with an image memory 13 connected to the image characteristic quantity calculator 5 and the image group classifier 6, and a layout memory 14 connected to the image layout section 8.

The image characteristic quantity calculator 5 calculates color histograms of images, image contents and the like as image characteristic quantities through image analysis of image data and associates the image data with the calculated image characteristic quantities.

The image group classifier 6 classifies a plurality of image data into a plurality of image groups (image clusters) based on the above-described image characteristic quantities according to the number of pages in a photo book to be created and associates the image data with information of the image groups. For instance, image data are classified into image groups so that one image group corresponds to one page of a photo book and the number of the image groups coincides with the number of pages in the photo book. The number of pages in the photo book to be created may be specified in advance or be specified or changed in the page number changer 10.

The image group sorter 7 changes the sequence of the image groups and, for instance, calculates an image group reference value for each image group from the image characteristic quantities of a plurality of images belonging to the relevant image group, calculates the similarity between the image groups based on the image group reference values, and sorts the image groups based on the similarity between the image groups. More specifically, the image group sorter 7 calculates centroid locations in the image groups based on the image characteristic quantities of image data, calculates the distances between the image groups based on the centroid locations in the image groups, and sorts the image groups based on the distances between the image groups so that the image groups are arranged in ascending order of distance, for instance.

The image layout section 8 arranges (lays out) the image data classified for each image group on display pages of the photo book. The image layout section 8 includes a plurality of layout arrangements stored in the layout memory 14 and, for instance, selects a layout arrangement according to the number of images, the image characteristic quantities, and the like, and associates the image data with the layout arrangement to lay out the image data. In addition to the layout arrangement, the image layout section 8 performs, for instance, selection or change of a background, arrangement of decorations, and the like, thereby creating page data corresponding to the display pages of the photo book as a final product.

The controller 9 controls each component of the image allocation device 2. The controller 9 acquires a plurality of images from the image storage device 1 according to an instruction made by a user using the operating section 11 and outputs data of the created photo book to the page display device 3 and the printer 4. In a case where the number of pages in the photo book to be created is changed by the page number changer 10, reclassification into image groups is performed based on the changed number of pages.

The page number changer 10 changes the number of display pages of the photo book according to an instruction from the user. As mentioned above, the user can specify the number of pages of the photo book to be created in advance through the page number changer 10.

The operating section 11 is used to input an instruction from the user and various known input devices such as a mouse, a keyboard and a touch panel can be used. The storage section 12 stores various types of information such as a program necessary for the operation of the image allocation device 2 and outputs various types of information to the controller 9 based on an instruction from the controller 9.

FIG. 2 is a flow chart showing a photo book creation flow of the photo book creation apparatus provided with the image allocation device 2 according to Embodiment 1. The photo book-creating operation is described with reference to FIG. 2.

First of all, in Step S1, the image allocation device 2 acquires a plurality of image data stored in the image storage device 1. In a case where the image storage device 1 is a server connected on the Internet, for instance, image data may be acquired through the Internet.

Next, in Step S2, the image characteristic quantity calculator 5 of the image allocation device 2 calculates image characteristic quantities of the respective image data, associates the image characteristic quantities with the image data, and outputs the image characteristic quantities associated with the image data to at least one of the image group classifier 6 and the image memory 13. For instance, the image characteristic quantity calculator 5 conducts image analysis for each image data so as to calculate the color histogram of image data as an image characteristic quantity.

In the subsequent Step S3, the image group classifier 6 classifies the plurality of image data into image groups, whose number corresponds with the number of pages in a photo book to be created, based on the image characteristic quantities calculated in the image characteristic quantity calculator 5.

Use may be made of various known clustering methods for the classification into image groups.

A description is given on a case in which a plurality of image data are classified into a specified number of image groups based on k-means clustering, for instance.

Figure 3A:
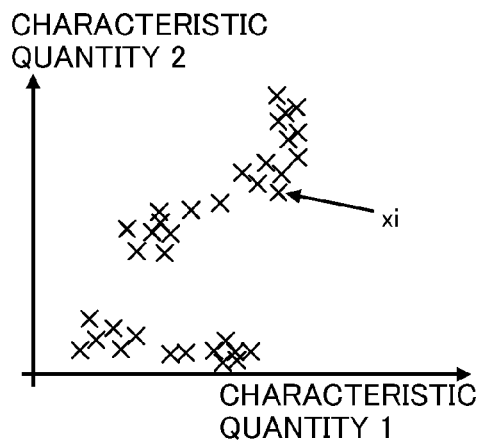
FIGS. 3A to 3F are explanatory diagrams illustrating k-means clustering which is an example of clustering.

As shown in FIG. 3A, a plurality of image data xi (i= 1, ..., n) are mapped with cross marks (x) based on image characteristic quantities. For illustrative purposes, FIG. 3A illustrates image data mapping in a two-dimensional manner but mapping may be in general multidimensional. Various image characteristic quantities can be taken into account.

Figure 3B:
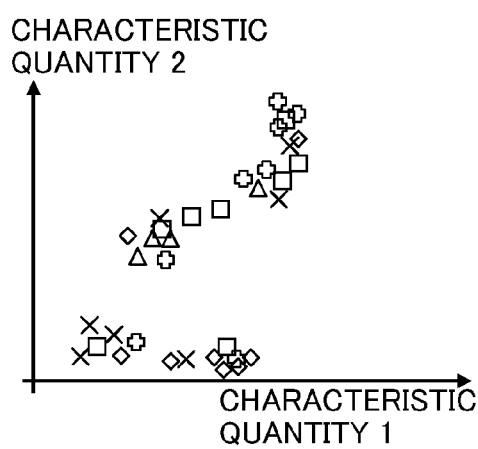

Next, as shown in FIG. 3B, the respective image data xi as mapped are subjected to random assignment to (random classification into) image groups (clusters). Here, the number of image groups (number of clusters), K, is defined to correspond with the number of pages of a photo book to be created. Since K is assumed to be 5 in the shown example, the cross marks representing the image data are randomly classified into five image groups and substituted by five kinds of graphic marks.

Figure 3C:
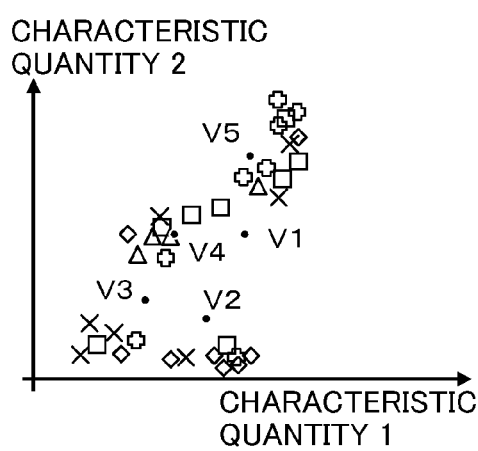

After the plurality of image data are randomly assigned to the image groups, the centroid locations (Vj (j=1, ..., K)) in the respective image groups are calculated. For instance, the arithmetic mean of the arrangement of the image data xi is used to calculate the centroid locations Vj. In FIG. 3C, since K=5, the centroid locations V1 to V5 of the five image groups are calculated.

Figure 3D:
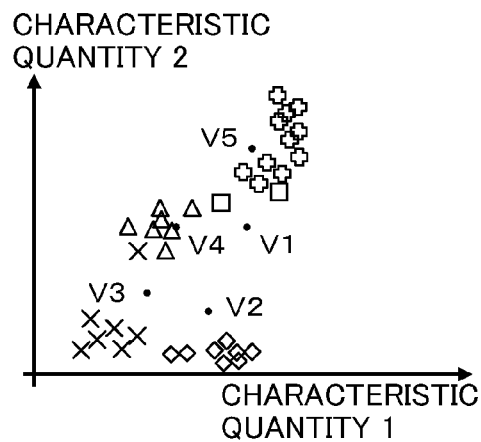

Then, the distances from the calculated centroid locations Vj of the respective image groups to the respective image data xi are determined and each of the image data xi is reassigned to the image group corresponding to the closest centroid location Vj. In FIG. 3D, the distances from the centroid locations V1 to V5 of the respective image groups to the respective image data xi are acquired, each of the image data xi as randomly classified into the five image groups is reassigned, based on the acquired distances, to the image group corresponding to one of the centroid locations V1 to V5 that is the closest to the relevant image data, and the five kinds of graphic marks as randomly given to the image data are so given again to the reassigned image data as to correspond to the image groups thereof.

When there is no change in assignment of all the image data xi to the image groups or the amount of change is below a specified threshold during the above-described reassignment to image groups, the assignment to image groups is considered to have converged, and is finished.

Figure 3E:
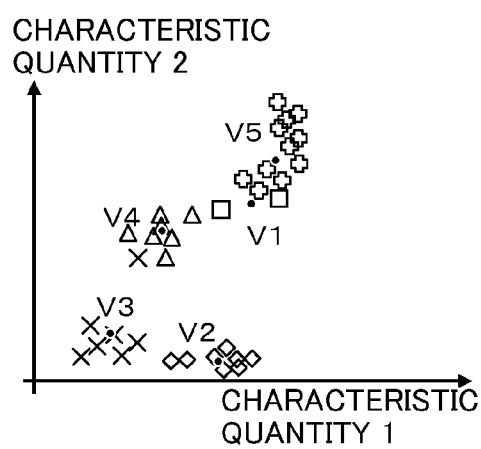

On the other hand, when there are changes in assignment to the image groups as shown in FIG. 3D, the centroid locations Vj of the respective image groups are recalculated based on the respective image data xi after the changes in the image groups. In FIG. 3E, the centroid locations V1 to V5 of the respective image groups are recalculated based on the respective image data xi after the changes in the image groups and the recalculated centroid locations V1 to V5 are redisplayed. A comparison between FIG. 3D and FIG. 3E shows that the centroid locations V1 to V5 of the image groups are shifted.

Figure 3F:
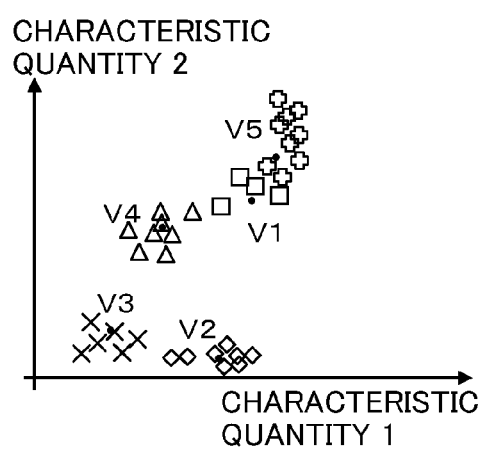

Then, as shown in FIG. 3F, the respective image data xi are assigned again to the image groups based on the recalculated centroid locations Vj of the respective image groups.

In Step S4, the distances between the respective image groups as mentioned above are calculated and the image groups are sorted in the image group sorter 7 based on the distances between the respective image groups. Since the distances between the image groups correspond to the similarity between the image groups, the image groups are sorted in ascending order of distance between the image groups so that similar image groups are adjacent to each other.

Figure 4:
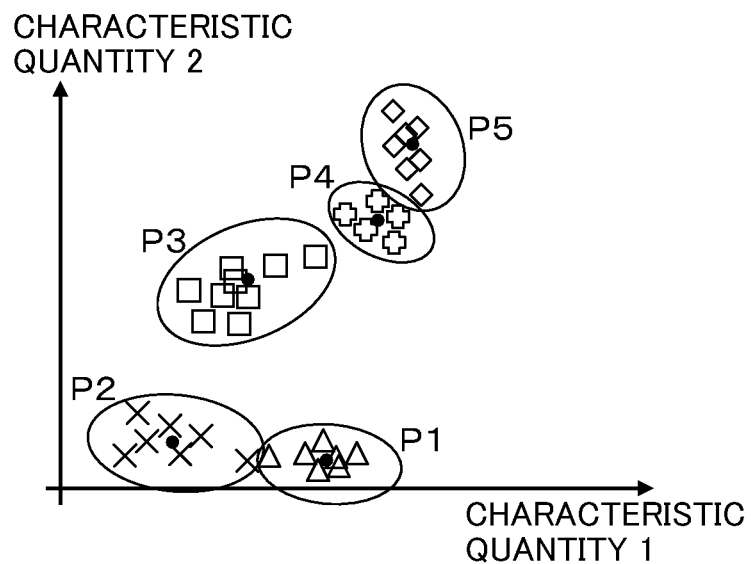
FIG. 4 is an explanatory diagram illustrating image groups and the centroid locations in the image groups.
Figure 5:
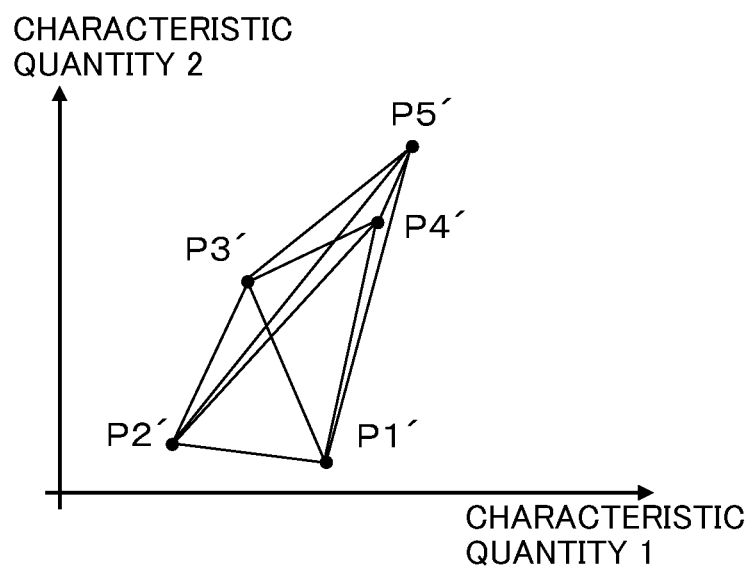
FIG. 5 is an explanatory diagram illustrating distances between the centroids in the image groups.

For instance, with respect to five image groups P1 to P5 shown in FIG. 4, centroid locations P1' to P5' of the respective image groups are calculated based on image characteristic quantities of image data of the respective image groups and the distances between the respective centroid locations P1' to P5' are calculated as shown in FIG. 5. In consideration of the distances between the respective centroid locations P1' to P5', the image groups should be arranged in the order of image group P1, image group P2, image group P3, image group P4 and image group P5.

As mentioned above, the image groups are sorted so that similar image groups are adjacent to each other. Thereafter, the images are arranged in the image layout section 8 as Step S5 so that each image group corresponds to each display page of the photo book to be created. The image layout section 8 acquires a layout display for a display page of the photo book which is stored in the layout memory 14, and associates the respective images making up an image group with the layout display to arrange the images on the display page.

The layout of the display page may be determined, for example, based on the number of images in an image group, based on the image characteristic quantities of the respective images making up an image group, or based on the combination thereof.

The image layout section 8 outputs data on the photo book having the respective images arranged on the display pages to the page display device 3.

Finally, in Step S6, the page display device 3 acquires the photo book data prepared in the image layout section 8 and displays the acquired photo book data. The photo book displayed on the page display device 3 may be output to a paper medium by the printer 4 according to an instruction from a user.

Next, the operation in a case where the number of pages of the photo book to be created is changed in the page number changer 10 is described.

When a user changed the number of pages of the photo book through the page number changer 10, the image group classifier 6 acquires the plurality of image data and the image characteristic quantities corresponding to the image data which are stored in the image memory 13, and performs the above-described Step S3 again, thereby reclassifying the image data into image groups so that the image groups correspond to the changed number of pages. Then, Steps S4 to S6 are performed based on the image groups obtained as a result of reclassification, whereby the photo book of which the number of pages was changed can be created.

The number of pages may also be changed while making use of the classification into the existing image groups made by the image group classifier 6.

Figure 6:
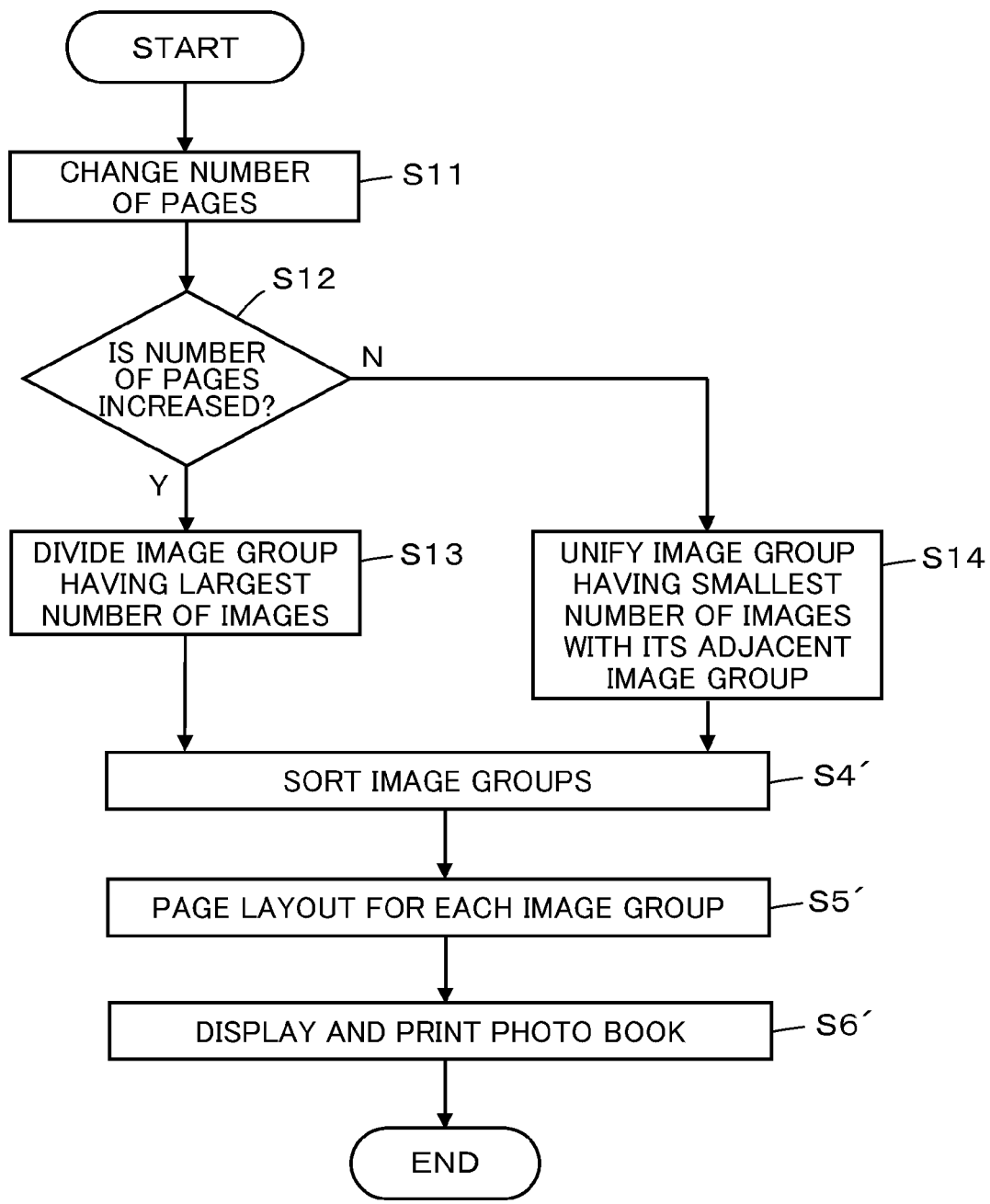
FIG. 6 is a flow chart showing a flow in a case where the number of pages is changed in the photo book creation apparatus of FIG. 1.

As shown in the flow chart of FIG. 6, when the number of pages of the photo book is changed by the page number changer 10 in Step S11, the controller 9 judges whether the number of pages is increased or decreased, as shown in Step S12. When the number of pages is increased, in Step S13, the image group classifier 6 can divide an image group having the largest number of images as shown in FIG. 7A. On the other hand, when the number of pages is decreased, in Step S14, the image group classifier 6 can unify an image group having the smallest number of images with its adjacent image group having the shortest distance from the image group having the smallest number of images, as shown in FIG. 7B.

Step S4' to Step S6' which are operations after the division or the unification are the same as Step S4 to Step S6 as described above.

According to the method shown in FIGS. 6, 7A and 7B, classification into image groups corresponding to the number of pages in the photo book to be created can be performed without the need for reclassification of a plurality of images into image groups in the image group classifier 6.

In the image allocation device according to Embodiment 1, a photo book is created by classifying images to be arranged on respective pages of the photo book into image groups corresponding to the number of pages of the photo book based on image characteristic quantities, changing the sequence of the image groups so that similar image groups are adjacent to each other, and arranging the images on the respective pages for each image group. Accordingly, it is possible to create a photo book having a desired layout that satisfies condition I, "an image group should properly be divided," condition II, "an image group should be allocated to adjacent pages as much as possible even if not properly divided," and condition III, "a balance should be struck between the number of images in an image group and the number of display pages."

Embodiment 2

In the above-described image allocation device according to Embodiment I, neither the shooting date and time nor the shooting order is taken into account. However, there is a case in which the shooting order can be estimated from an image file name or the like even if meta-information such as Exif is deleted and there is no information on the shooting date and time. In this case, by taking the shooting order into account, the classification of images into image groups can be further refined and the image allocation among display pages in a photo book can be further refined.

Figure 8:
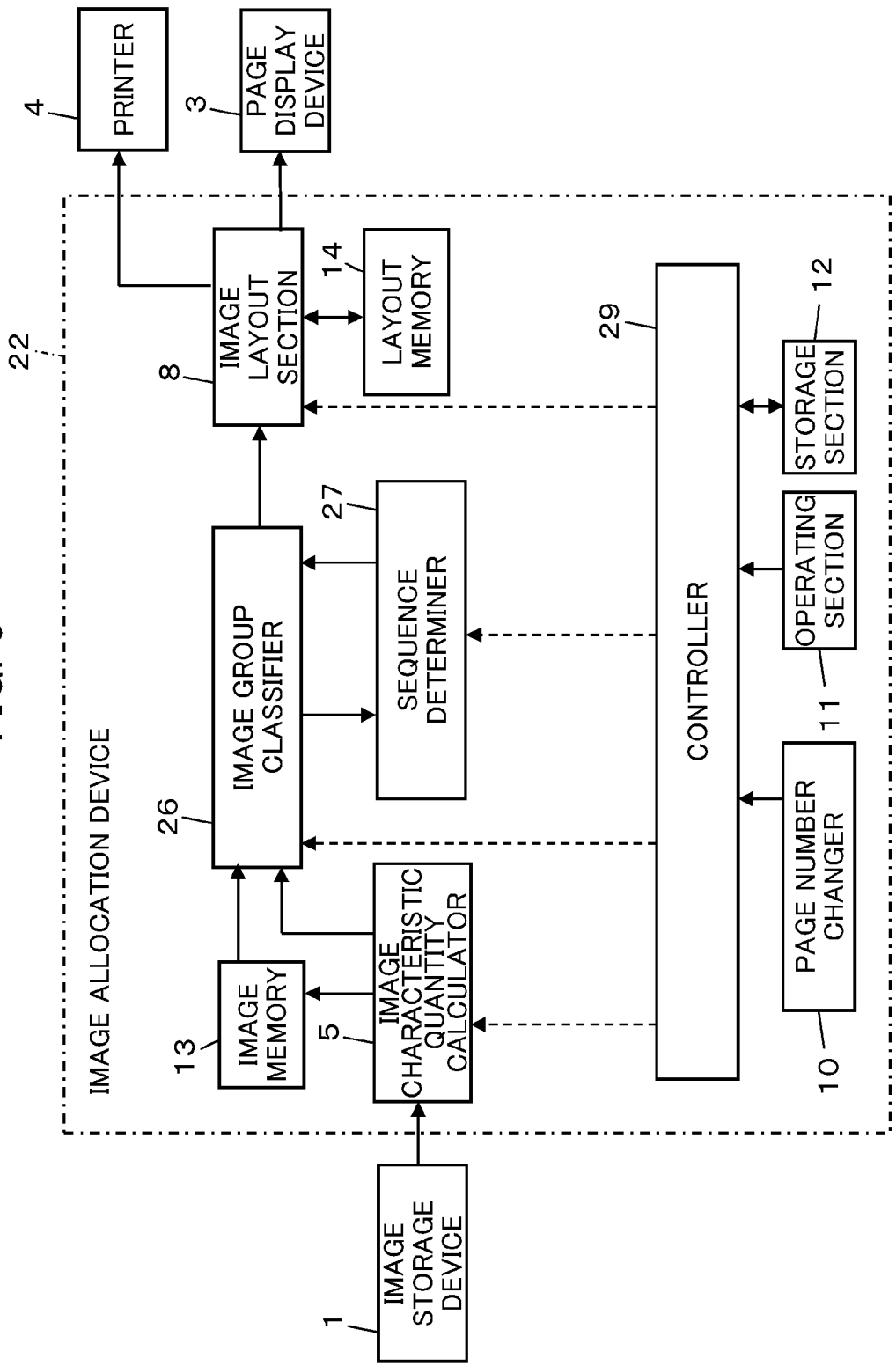
FIG. 8 is a block diagram showing a configuration of a photo book creation apparatus provided with an image allocation device according to Embodiment 2 of the invention.

FIG. 8 is a block diagram showing a configuration of a photo book creation apparatus provided with an image allocation device according to Embodiment 2 of the invention.

As shown in FIG. 8, the image allocation device 22 according to Embodiment 2 has the same configuration as the image allocation device 2 according to Embodiment 1 except that the image allocation device 22 is configured to include an image group classifier 26 connected to an image memory 13, an image characteristic quantity calculator 5 and an image layout section 8; a sequence determiner 27 connected to the image group classifier 26; and a controller 29 connected to each of the components of the image allocation device 22 including the image group classifier 26 and the sequence determiner 27.

As in Embodiment 1, the image group classifier 26 classifies a plurality of image data into image groups, whose number corresponds with the specified number of pages, based on image characteristic quantities calculated in the image characteristic quantity calculator 5.

The image group classifier 26 reclassifies a plurality of images into image groups, whose number corresponds with the number of pages in a photo book to be created, based on the sequence as determined by the sequence determiner 27 and the above-described information on the image groups. A detailed method for reclassification into image groups will be described later.

The sequence determiner 27 determines the image data sequence in the whole of a plurality of image data regardless of the classification into image groups. If the image shooting order is known for a plurality of image data, for instance, the sequence determiner 27 determines the sequence of the whole of the plurality of image data based on the image shooting order. Alternatively, if information on the shooting date and time is known instead of the shooting order, image data may be sorted based on the information on the shooting date and time. Still alternatively, if at least a part of meta-information such as Exif of image data remains, for instance, if GPS positional information is known, the image data may be sorted taking the GPS positional information into account.

The controller 29 is different from the controller 9 of Embodiment 1 in that the controller 29 is connected to the sequence determiner 27 and controls sorting of image data in the sequence determiner 27 and that the controller 29 controls reclassification into image groups in the image group classifier 26 based on image characteristic quantities and the sequence of image data.

FIG. 9 is a flow chart showing a photo book creation flow of the photo book creation apparatus provided with the image allocation device 22 according to Embodiment 2. The photo book-creating operation is described with reference to FIG. 9.

Step S1' to Step S3', Step S5" and Step S6" are the same as Step S1 to Step S3, Step S5 and Step S6 in Embodiment 1, so their description is omitted and a detailed description is given on Step S21 and Step S22 which are different in operation from Embodiment 1.

In Step S21, the sequence determiner 27 determines the sequence of the whole of a plurality of image data classified into a plurality of image groups, as shown in FIG. 10A. For instance, when the shooting order of a plurality of images is apparent, the sequence of the plurality of image data is determined by sorting the plurality of image data based on the shooting order. The sequence determiner 27 outputs the image data sequence to the image group classifier 26.

In the subsequent Step S22, the image group classifier 26 performs reclassification into image groups. The reclassification into image groups in Step S22 is performed in Steps S31 to S36 shown in detail in FIG. 11.

In Step S31, as shown in FIG. 10B, the image data are reclassified into new image groups every time the image group type changes in the image data sequence, according to the sequence of the plurality of image data as determined by the sequence determiner 27 and the classification into the image groups in the above-described Step S3'.

In the subsequent Step S32, the similarity between adjacent images is calculated according to the sequence of the plurality of image data. The similarity between adjacent images may be calculated, for example, based on two image characteristic quantities of the adjacent image data.

Next, in Step S33, the number of image groups obtained by the reclassification in Step S31 is compared with the number of pages of a photo book to be created. If the number of image groups is coincident with the number of pages, the process proceeds to Step S5" and if the number of image groups is not coincident with the number of pages, the process proceeds to Step S34.

In Step S34, the number of image groups obtained by the reclassification is compared with the number of pages. If the number of image groups is smaller than the number of pages, the process proceeds to Step S35 and if the number of image groups is larger than the number of pages, the process proceeds to Step S36.

If the number of image groups obtained by the reclassification is smaller than the number of pages, the image group having the largest number of images is divided in Step S35. More specifically, the image group having the largest number of images is divided where the similarity between the adjacent images is the lowest, the number of image groups is thus increased by one and the process is returned to just before Step S33. An exemplary case in which the number of image groups is smaller than the number of pages in Step S22 is a case in which the number of pages was changed in the page number changer 10.

If the number of image groups obtained by the reclassification is larger than the number of pages, the similarity between adjacent images at the boundary between image groups is calculated in Step S36, as shown in FIG. 10C, image groups adjoining at a point with the highest similarity are unified together, and the number of image groups is thus decreased by one to return the process to just before Step S33.

By repeating Step S33 to Step S36, the number of image groups obtained by the reclassification can be made coincident with the number of pages in the image group classifier 26, as shown in FIG. 10D, without changing the sequence of the plurality of image data.

Step S5" and Step S6" which follow Step S33 to Step S36 are the same as Step S5 and Step S6 in Embodiment 1, respectively.

By classifying a plurality of images and performing the layout of pages of a photo book as described above, the layout of the photo book can be performed in consideration of both the image characteristic quantities for each image and the image shooting order. Accordingly, as in Embodiment 1, it is possible to create a photo book having a desired layout that satisfies condition I, "an image group should properly be divided," condition II, "an image group should be allocated to adjacent pages as much as possible even if not properly divided," and condition III, "a balance should be struck between the number of images in an image group and the number of display pages."

Embodiment 3

In a case where, in a plurality of image data, image data having shooting information which includes the shooting order or the shooting date and time (hereinafter referred to as "image data having shooting information") and image data having no shooting information are included together, a photo book may be created in consideration of the difference in the number of images between the image data having shooting information and the image data having no shooting information.

Figure 12:
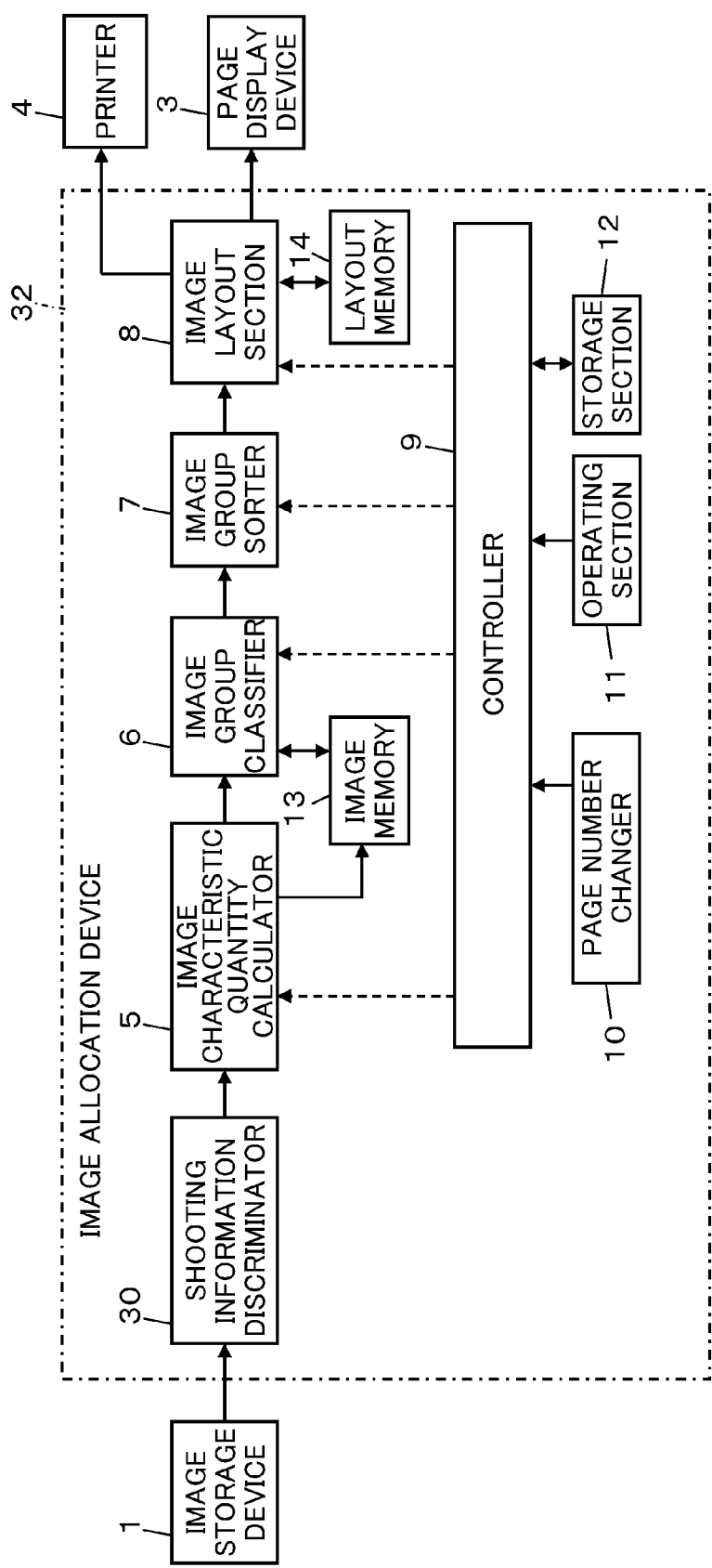
FIG. 12 is a block diagram showing a configuration of a photo book creation apparatus provided with an image allocation device according to Embodiment 3 of the invention.
Figure 13:
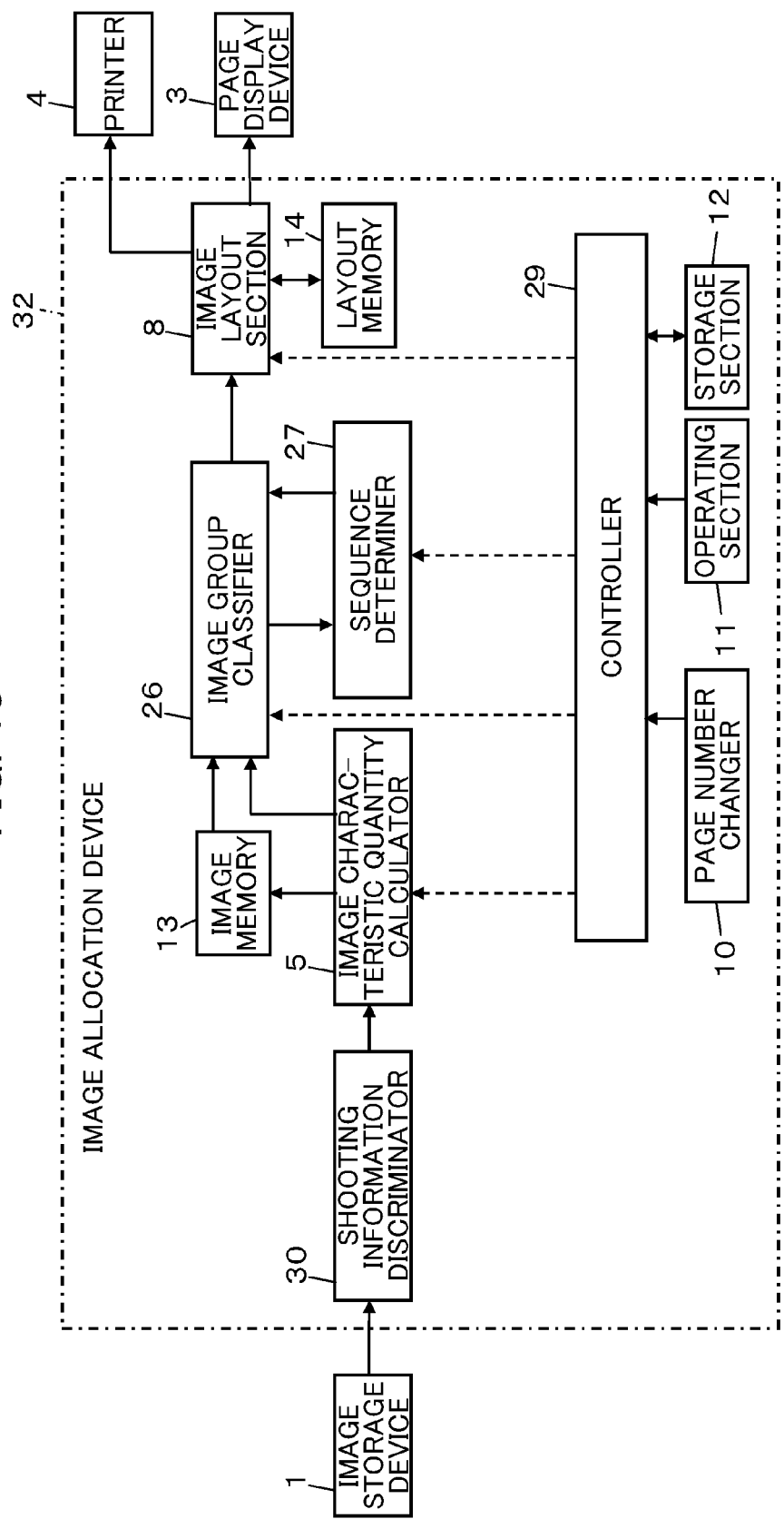
FIG. 13 is a block diagram showing another configuration of the photo book creation apparatus provided with the image allocation device according to Embodiment 3 of the invention.

As shown in FIG. 12 or FIG. 13, an image allocation device 32 according to Embodiment 3 is the same as the image allocation device 2 according to Embodiment 1 or the image allocation device 22 according to Embodiment 2 except that a shooting information discriminator 30 is provided just before an image characteristic quantity calculator 5.

The image allocation device 32 includes the shooting information discriminator 30. Of a plurality of image data output from an image storage device 1 to the image allocation device 32, the shooting information discriminator 30 discriminates between image data having shooting information and image data having no shooting information. If the shooting information discriminator 30 determines that the number of images in the image data having no shooting information is larger by at least a predetermined number than the number of images in the image data having shooting information, the image group classifier 6 or 26 classifies the plurality of image data into image groups, whose number corresponds with the number of pages in a photo book to be created, according to the method described in Embodiment 1 or Embodiment 2. On the other hand, if the shooting information discriminator 30 determines that the number of images in the image data having shooting information is larger by at least a predetermined number than the number of images in the image data having no shooting information, or that the difference between the number of images in the image data having no shooting information and the number of images in the image data having shooting information falls within a predetermined range, the shooting information discriminator 30 outputs the image data having shooting information selected from the plurality of image data to the image characteristic quantity calculator 5 so that the image data having shooting information may solely be classified into image groups in the image group classifier 6 or 26, and subsequently outputs the image data not having shooting information to the image characteristic quantity calculator 5 so that the image data not having shooting information may be added to the image groups composed of the image data having shooting information in the image group classifier 6 or 26.

Figure 14:
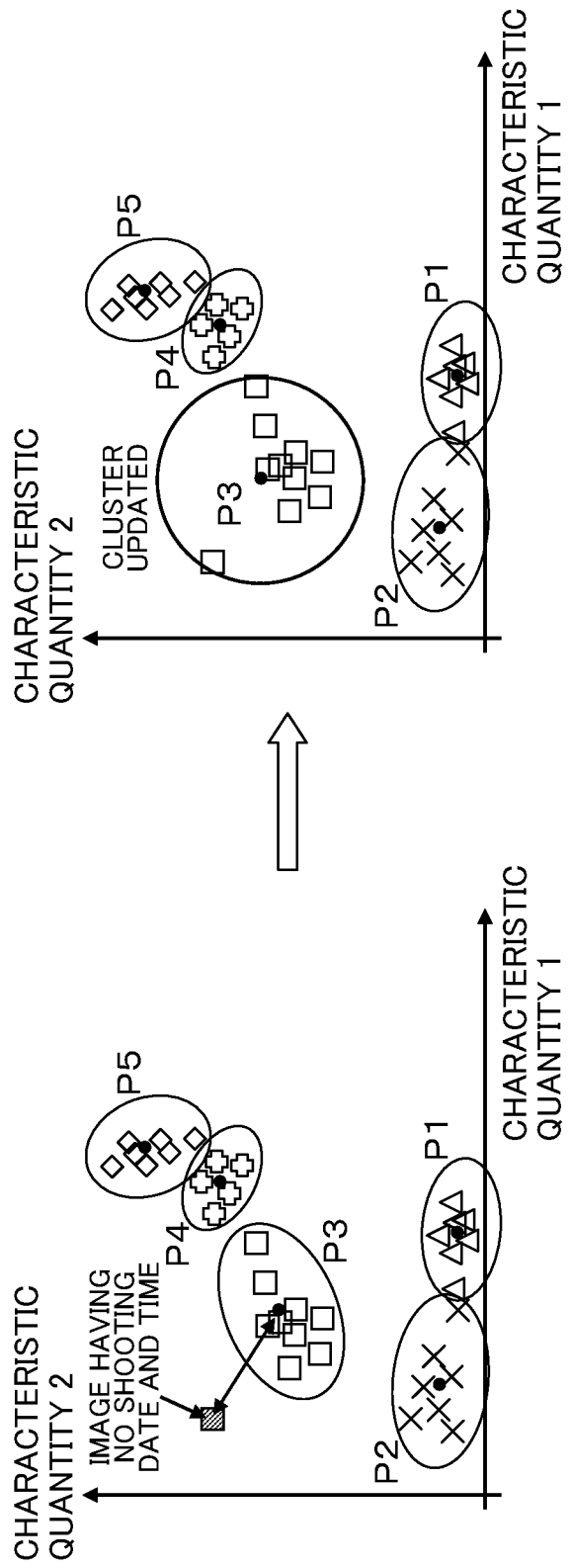
FIG. 14 is an explanatory diagram illustrating a case where an image having no shooting date and time is added to an image group composed of images each having the shooting time and date in the image allocation devices shown in FIGS. 12 and 13.

As for the addition of the image data having no shooting information to the image groups composed of the image data having shooting information, as shown in FIG. 14, an image group classifier 6 or 26 calculates the distances between image data having no shooting information and the respective image groups based on the centroids of the respective image groups as determined by the image characteristic quantities and on the image characteristic quantities of an image having no shooting information, and adds the image data having no shooting information to the nearest image group, i.e., to the image group having the highest similarity.

The plurality of image data can be classified into image groups corresponding to the number of pages of a photo book to be created as in Embodiments 1 and 2 by recalculating the centroid locations of the image groups based on the image characteristic quantities every time the image data having no shooting information is added and repeating the addition of the image data having no shooting information to the image groups until the image data having no shooting information are used up.

In a case where a page of a photo book is displayed on the page display device 3 in the photo book creation apparatus provided with any of the image allocation devices according to Embodiments 1 to 3, images may be displayed in a distinctive manner so that images having shooting information including shooting date and time information or shooting order information can be discriminated from images having no shooting information. For instance, as shown in FIG. 15, a page may be displayed through superimposed display of a predetermined icon on images having shooting information so that the images having shooting information can be discriminated from images having no shooting information.

This allows a user to discriminate the images having shooting information from the images having no shooting information at first sight and to easily check, for instance, whether the images having no shooting information are where they are essentially not to be arranged.

Figure 15:
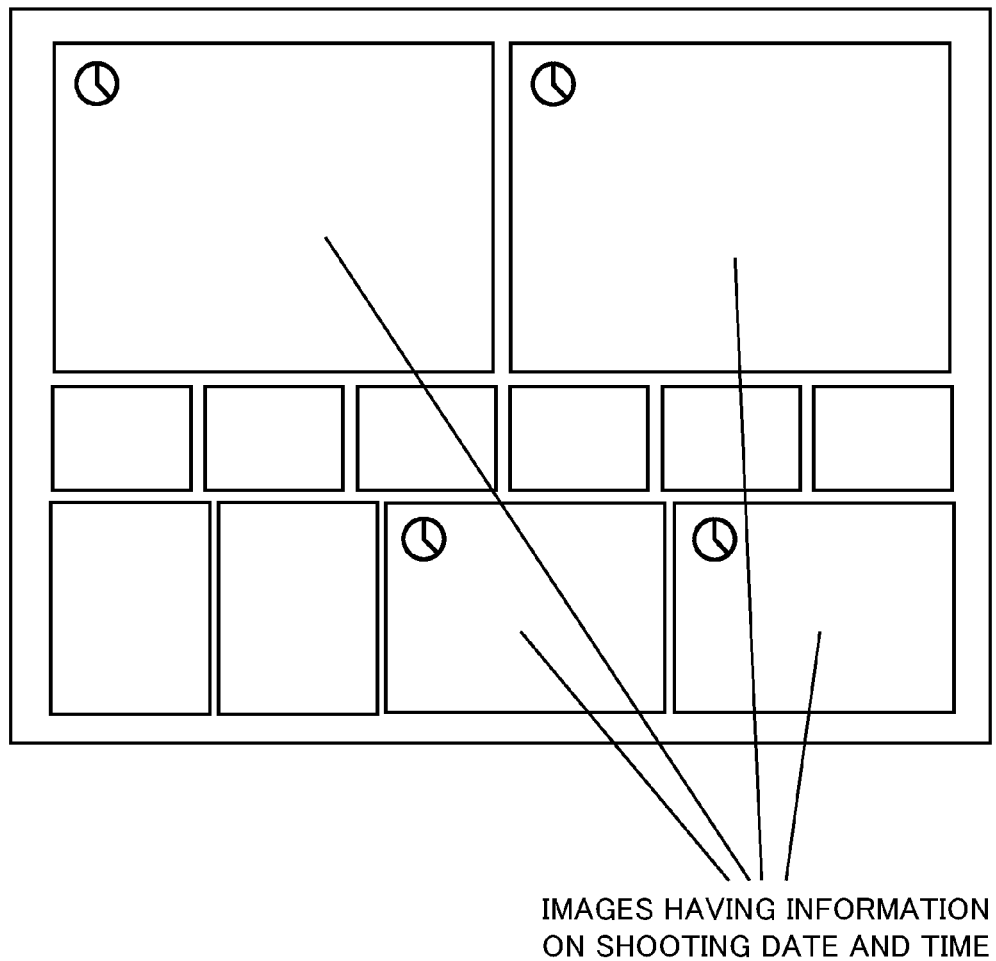
FIG. 15 is an explanatory diagram illustrating an exemplary case where a display page in a photo book is displayed on a page display device.

When laying out the respective images on display pages in the image layout section 8 of any of the image allocation devices according to Embodiments 1 to 3, images having shooting information may be arranged, for instance, in larger sizes than images having no shooting information, as shown in FIG. 15. Even if the images having no shooting information are where they are essentially not to be arranged, a feeling of strangeness can be reduced by arranging the images having shooting information in larger sizes than the images having no shooting information.

According to Embodiment 3, an operating section 11 (doubling as a classification selector of the invention) of the image allocation device 32 may be operated to select either performing classification into image groups taking shooting information into account or performing classification into image groups based on image characteristic quantities without taking shooting information into account.

In a case where classification into image groups is performed taking shooting information into account, the classification into image groups is performed after a plurality of images are discriminated in the shooting information discriminator 30 as described in Embodiment 3. On the other hand, in a case where classification into image groups is performed without taking shooting information into account, the classification into image groups is performed as described in Embodiment 1 or Embodiment 2 without discriminating the shooting information in the shooting information discriminator 30.

In a case where the number of pages of a photo book is not specified in advance in Embodiment 2, the recommended number of pages of the photo book may be determined and proposed to a user.

For instance, after the sequence determiner 27 of the image allocation device 22 determines the sequence of a plurality of image data, the image group classifier 26 calculates the inter-image similarity between adjacent image data based on image characteristic quantities and determines the recommended number of pages based on the calculated inter-image similarity. This is also applicable to the image allocation device 32 in Embodiment 3 which includes the configuration of the image allocation device 22 in Embodiment 2.

As shown in Steps S51 to S54 of FIG. 16, an image group is divided where the similarity between adjacent images is the lowest, based on the image data sequence.

Assuming that a plurality of images constitute a single image group as a whole, the image group is divided into two image groups at a point A1 where the similarity between adjacent images is the lowest, as shown in Step S51. If the similarity between adjacent images at the division point A1 is smaller than a predetermined value, in Step S52, an image group is divided into two image groups at a point A2 with the second lowest similarity between adjacent images. If the similarity between adjacent images at the division point A2 is smaller than the predetermined value, the same procedure is repeated: In Step S53, an image group is divided into two image groups at a point A3 with the third lowest similarity between adjacent images, and in Step S54, an image group is divided into two image groups at a point A4 with the fourth lowest similarity between adjacent images. If the similarity between adjacent images at the division point A4 is equal to or higher than the predetermined value in Step S54, no further image group division is performed and the current number of image groups is deemed to be the recommended number of pages.

In FIG. 16, the images are divided into five image groups P1 to P5 at the division points A1 to A4 and hence the recommended number of pages is five.

Moreover, a collage composed of a plurality of images may be created based on image groups obtained by division in Embodiments 1 to 3.

Figure 17A:
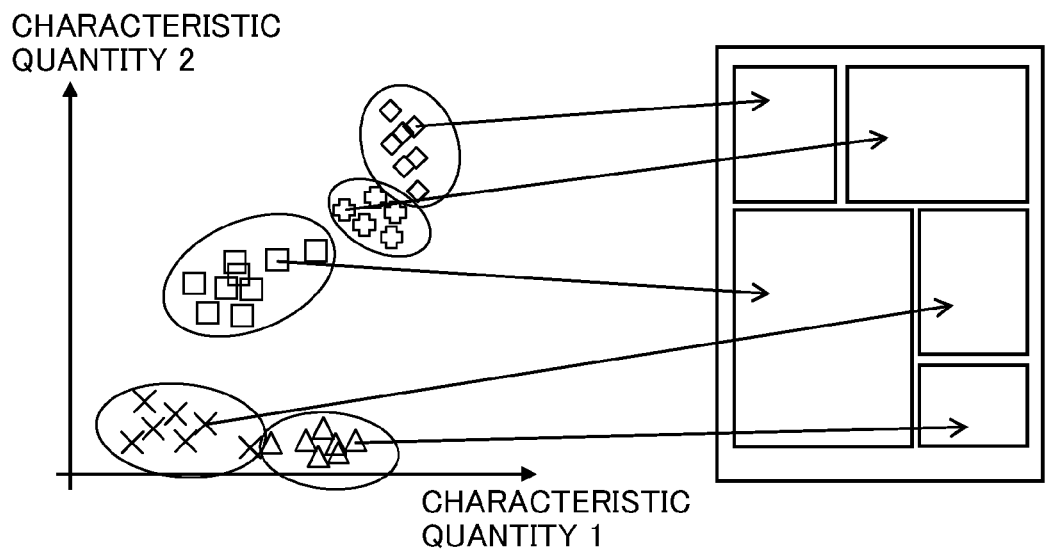
FIGS. 17A and 17B are explanatory diagrams each illustrating a creation method in a case where a collage is created in the image allocation device of the invention.
Figure 17B:
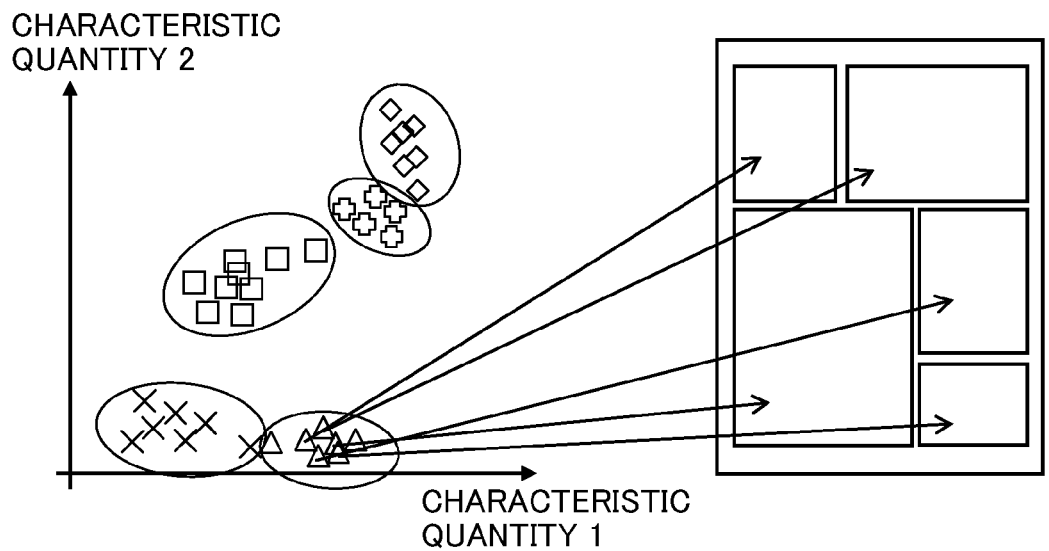

For instance, a collage may be created as shown in FIG. 17A by extracting a piece of image data having the largest image characteristic quantity from each image group, or a collage may be created as shown in FIG. 17B by extracting a plurality of image data from one image group in descending order of image characteristic quantity.

Not only a color histogram but also image sharpness and the like may be used for the above-described image characteristic quantities.

Embodiment 4

Each of the image allocation devices 2, 22, 32 according to Embodiments 1 to 3 of the invention is provided with the image characteristic quantity calculator 5 to acquire a plurality of image data and to calculate image characteristic quantities of the respective image data. However, the image allocation device of the invention may perform image allocation by acquiring a plurality of image data of which the image characteristic quantities were calculated in advance.

Figure 18:
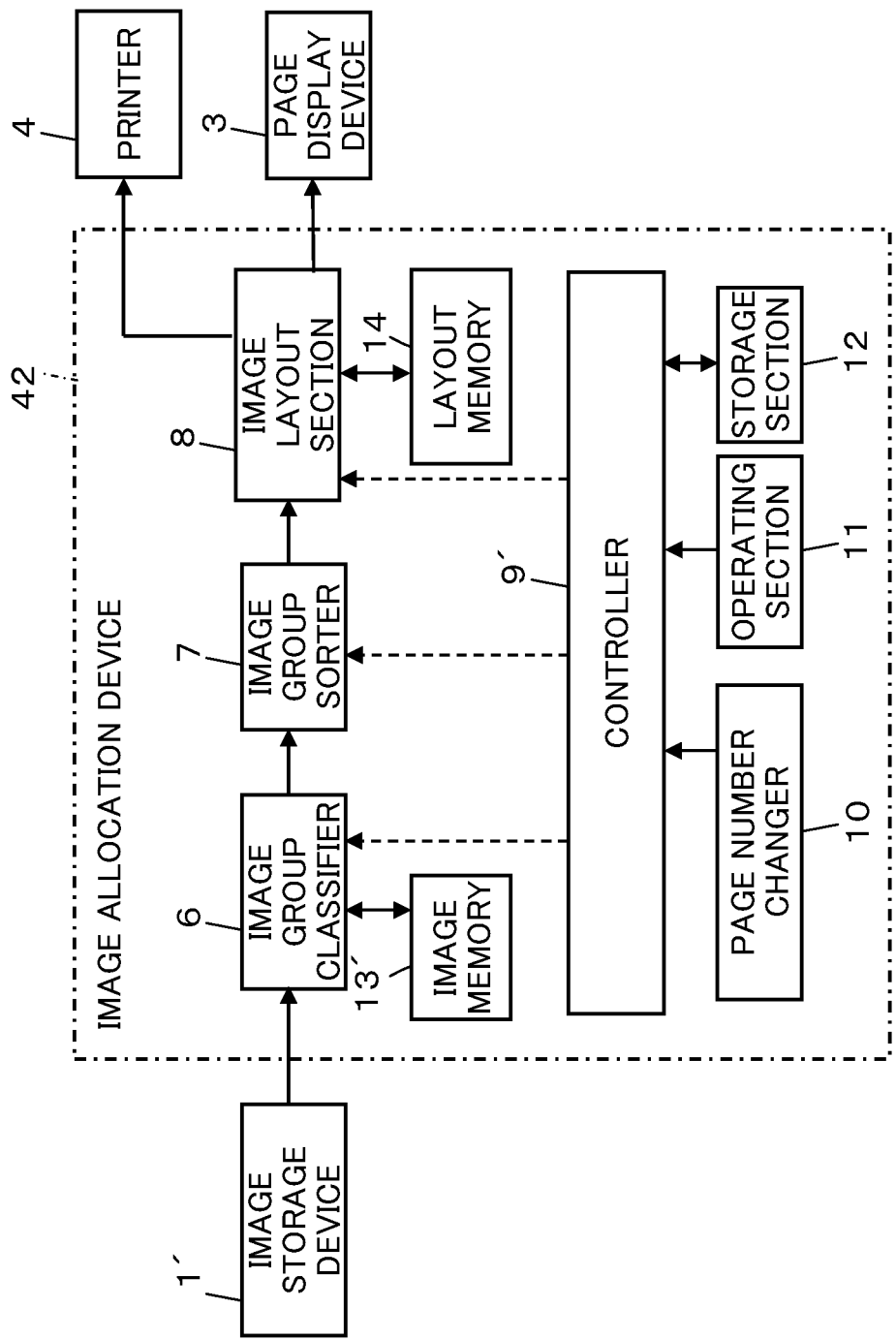
FIG. 18 is a block diagram showing a configuration of a photo book creation apparatus provided with an image allocation device according to Embodiment 4 of the invention.
Figure 19A:
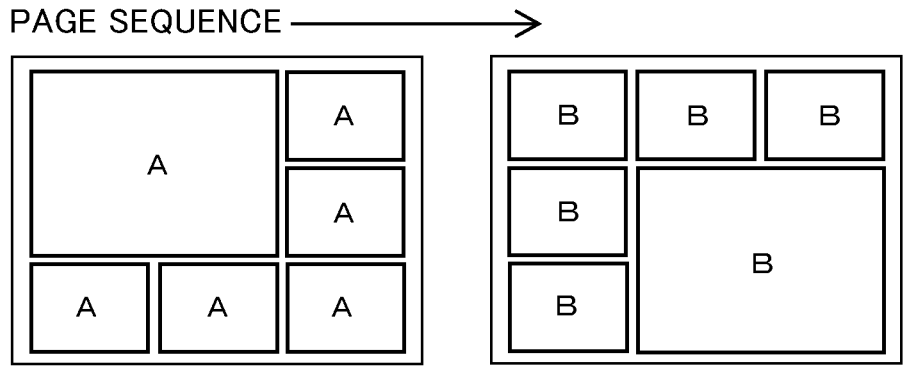
FIGS. 19A to 19C are each an explanatory diagram illustrating a relationship between display pages in a photo book and image groups.
Figure 19B:
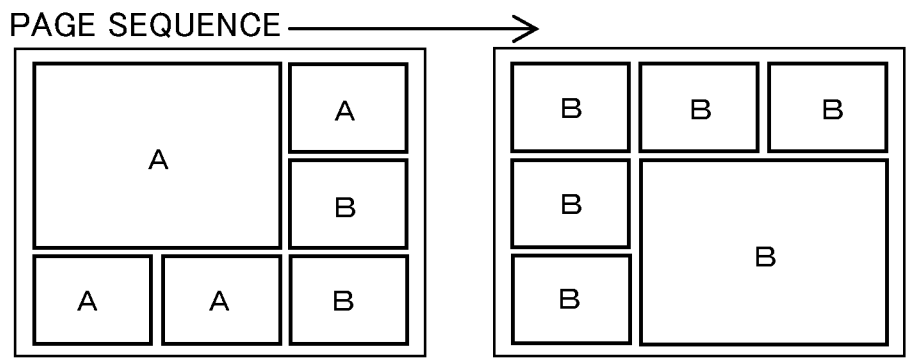
Figure 19C:
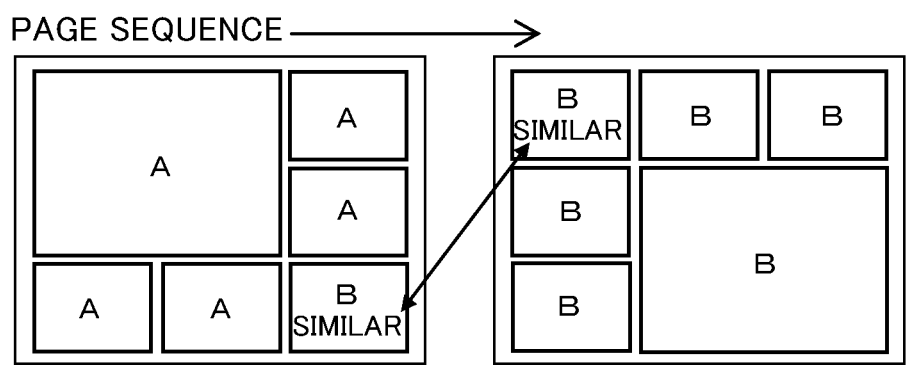

An image allocation device 42 according to Embodiment 4 of the invention is not provided with the image characteristic quantity calculator 5 according to Embodiment 1, as shown in FIG. 18. Therefore, according to the comparison with the image allocation device 2 in Embodiment 1, an image memory 13' is only connected to an image group classifier 6; a controller 9' is only connected to the image group classifier 6, an image group sorter 7, an image layout section 8, a page number changer 10, an operating section 11 and a storage section 12. In addition, a plurality of image data corresponding to a plurality of images, which are stored in an image storage device 1' and are output to the image allocation device 42, possess their corresponding image characteristic quantities in advance.

Apart from the foregoing description, the configuration and the operation of the image allocation device 42 according to Embodiment 4 is the same as the image allocation device 2 according to Embodiment 1.

The above-described configuration in which the image characteristic quantity calculator 5 in Embodiment 1 is not provided is also applicable to Embodiments 2 and 3 of the invention. These cases are also based on the premise that a plurality of image data acquired by the image allocation devices possess their corresponding image characteristic quantities in advance, as described above.

Irrespective of whether the image characteristic quantities are calculated in the image characteristic quantity calculator 5 as described in the foregoing Embodiments 1 to 3 or calculated in advance and stored with image data as described in the foregoing Embodiment 4, the image characteristic quantities need only be associated with their corresponding image data. For instance, they may be stored as accessory data of image data or may be stored as data separate from image data.

The above-described shooting information is not limited to information related to shooting such as shooting date and time and shooting order, and for example, the image data acquisition date and time or the image characteristic quantity calculation date and time in the image allocation device, the image data storage date and time in the image storage device (e.g., the date and time of upload of image data to an image server or the like) or other meta-information may be used.

Embodiment 2 is based on the premise that meta-information of image data is deleted, but as described above, the date and time when the image storage device 1 stored image data, the date and time when the image allocation device 22 acquired the image data or the like may be stored as new meta-information of the image data.

In this case, the image sequence may be determined, for example, by making use of the above-described image data storage date and time in the image storage device 1, image data acquisition date and time in the image allocation device 22 and the like instead of the shooting order.

In Embodiment 3, the shooting information discriminator 30 discriminates between image data having shooting information and image data having no shooting information based on whether or not there is shooting information. However, in a case where the image data acquisition date and time or the image characteristic quantity calculation date and time in the image allocation device, the image data storage date and time in the image storage device and the like are used as new shooting information as described above, image data may be classified according to the type of the shooting information. For instance, the shooting information discriminator 30 may discriminate between the shooting information on the shooting date and time or the shooting order and the newly added shooting information, such as the image data acquisition date and time or the image characteristic quantity calculation date and time in the image allocation device and the image data storage date and time in the image storage device as described above, and perform image data classification according to the type of the shooting information.

Also in Embodiment 4, the image data acquisition date and time or the image characteristic quantity calculation date and time in the image allocation device, the image data storage date and time in the image storage device or the like as described above can be used as the shooting information.

While the photo book creation apparatus provided with the image allocation device of the present invention and the method of creating a photo book using the image allocation method of the present invention have been described in detail above, the present invention is not limited to the above embodiments, and various improvements and modifications may be made without departing from the spirit and scope of the invention.

What is claims is:

1. An image allocation device configured to allocate images to be displayed among display pages based on classification into image groups, comprising:
    an image group classifier configured to classify a plurality of image data having image characteristic quantities into the image groups, whose number corresponds with a number of pages of the display pages, based on the image characteristic quantities;
    an image group sorter configured to change a sequence of the image groups according to distances between the image groups, with the distances being determined by the image characteristic quantities, and
    a page number changer configured to change the number of pages, and
    a processor configured to execute processing of each component in the image allocation device,
    wherein, in a case where the number of pages is changed in the page number changer, the image group classifier reclassifies the plurality of image data into image groups, whose number corresponds with a changed number of pages, based on the image characteristic quantities.

2. The image allocation device according to claim 1, further comprising an image characteristic quantity calculator configured to individually calculate the image characteristic quantities of the plurality of image data.

3. The image allocation device according to claim 1, wherein, in a case where the number of pages is increased in the page number changer, the image group classifier divides the image groups sequentially in descending order of number of images in an image group until the number of the image groups corresponds with a changed number of pages, and in a case where the number of pages is decreased in the page number changer, the image group classifier sequentially unifies the image groups such that an image group having a smallest number of images and an image group closest to the image group having the smallest number of images are unified into one image group, until the number of the image groups corresponds with a changed number of pages.

4. An image allocation device configured to allocate images to be displayed among display pages based on classification into image groups, comprising:
    an image group classifier configured to classify a plurality of image data having image characteristic quantities into the image groups, whose number corresponds with a number of pages of the display pages, based on the image characteristic quantities; and
    a sequence determiner configured to determine a sequence of the plurality of image data based on shooting information that the plurality of image data have,
    wherein the image group classifier reclassifies the plurality of image data into the image groups, whose number corresponds with the number of pages of the display pages, based on the image characteristic quantities, the classification into the image groups, and the sequence of the plurality of image data.

5. The image allocation device according to claim 4, further comprising an image characteristic quantity calculator configured to individually calculate the image characteristic quantities of the plurality of image data.

6. The image allocation device according to claim 4, further comprising a page number changer configured to change the number of pages.

7. The image allocation device according to claim 4, wherein the image group classifier calculates inter-image similarity between adjacent image data based on the image characteristic quantities and the sequence, and reclassifies the plurality of image data into the image groups, whose number corresponds with the number of pages of the display pages, based on the inter-image similarity.

8. The image allocation device according to claim 4, wherein the image group classifier calculates inter-image similarity between adjacent image data based on the image characteristic quantities and the sequence, and calculates a recommended number of pages of the display pages based on the inter-image similarity.

9. The image allocation device according to claim 4, wherein the image group classifier classifies the plurality of image data into a plurality of new image groups based on the classification into the image groups and the sequence, calculates inter-image similarity between adjacent images based on the image characteristic quantities and the sequence, and performs unification or division of the plurality of new image groups based on the inter-image similarity to reclassify the plurality of image data into the image groups whose number corresponds with the number of pages of the display pages.

10. The image allocation device according to claim 4, further comprising a shooting information discriminator,
wherein the shooting information discriminator discriminates the plurality of image data into image data having the shooting information and image data not having the shooting information.

11. The image allocation device according to claim 10,
wherein, in a case where the shooting information discriminator determines that a number of images of the image data not having the shooting information is larger by at least a predetermined number than a number of images of the image data having the shooting information, the image group classifier classifies the image data having the shooting information and the image data not having the shooting information into a plurality of image groups without distinction, and
wherein, in a case where the shooting information discriminator determines that the number of images of the image data having the shooting information is larger by at least a predetermined number than the number of images of the image data not having the shooting information, or that a difference between the number of images of the image data having the shooting information and the number of images of the image data not having the shooting information is within a predetermined range, the image group classifier classifies the image data having the shooting information into a plurality of image groups and adds the image data not having the shooting information to one or more out of the plurality of image groups of the image data having the shooting information based on the image characteristic quantities.

12. The image allocation device according to claim 10, further comprising a classification selector,
wherein the classification selector selects either performing the classification into the image groups taking the shooting information into account or performing the classification into the image groups based on the image characteristic quantities,
wherein, in a case where the classification into the image groups is performed taking the shooting information into account, the image group classifier classifies the plurality of image data into the image groups after discrimination of the plurality of image data by the shooting information discriminator, and
wherein, in a case where the classification into the image groups is performed based on the image characteristic quantities, the image group classifier classifies the plurality of image data into the image groups without discrimination of the plurality of image data by the shooting information discriminator.

13. The image allocation device according to claim 4, wherein the shooting information includes shooting date and time information or shooting order information.

14. An image allocation method for allocating images to be displayed among display pages based on classification into image groups, comprising:
classifying a plurality of image data having image characteristic quantities into the image groups, whose number corresponds with a number of pages of the display pages, based on the image characteristic quantities;
changing a sequence of the image groups according to distances between the image groups, with the distances being determined by the image characteristic quantities, and
changing the number of pages,
wherein the classification into the image groups is performed based on a changed number of pages, and
in a case where the number of pages is changed, the plurality of image data are reclassified into image groups, whose number corresponds with a changed number of pages, based on the image characteristic quantities.

15. The image allocation method according to claim 14, wherein the image characteristic quantities of the plurality of image data are individually calculated before the classification into the image groups.

16. The image allocation method according to claim 14,
wherein, in a case where the number of pages is increased, the image groups are divided sequentially in descending order of number of images in an image group until the number of the image groups corresponds with a changed number of pages, and
wherein, in a case where the number of pages is decreased, the image groups are sequentially unified such that an image group having a smallest number of images and an image group closest to the image group having the smallest number of images are unified into one image group, until the number of the image groups corresponds with a changed number of pages.

17. An image allocation method for allocating images to be displayed among display pages based on classification into image groups, comprising:
classifying a plurality of image data having image characteristic quantities into the image groups, whose number corresponds with a number of pages of the display pages, based on the image characteristic quantities;
determining a sequence of the plurality of image data based on shooting information that the plurality of image data have; and
reclassifying the plurality of image data into the image groups, whose number corresponds with the number of pages of the display pages, based on the image characteristic quantities, the classification into the image groups, and the sequence of the plurality of image data.

18. The image allocation method according to claim 17, wherein the image characteristic quantities of the plurality of image data are individually calculated before the classification into the image groups.

19. The image allocation method according to claim 17, further comprising changing the number of pages,
wherein the classification into the image groups is performed based on a changed number of pages.

20. The image allocation method according to claim 17,
wherein inter-image similarity between adjacent image data is calculated based on the image characteristic quantities and the sequence, and
wherein the plurality of image data are reclassified into the image groups, whose number corresponds with the number of pages of the display pages, based on the inter-image similarity.

21. The image allocation method according to claim 17,
wherein inter-image similarity between adjacent image data is calculated based on the image characteristic quantities and the sequence, and
wherein a recommended number of pages of the display pages is calculated based on the inter-image similarity.

22. The image allocation method according to claim 17,
wherein the plurality of image data are classified into a plurality of new image groups based on the classification into the image groups and the sequence,
wherein inter-image similarity between adjacent image data is calculated based on the image characteristic quantities and the sequence, and
wherein unification or division of the plurality of new image groups is performed based on the inter-image similarity to reclassify the plurality of image data into the image groups whose number corresponds with the number of pages of the display pages.

23. The image allocation method according to claim 17, wherein the plurality of image data are discriminated into image data having the shooting information and image data not having the shooting information.

24. The image allocation method according to claim 23,
wherein, in a case where a number of images of the image data not having the shooting information is larger by at least a predetermined number than a number of images of the image data having the shooting information, the image data having the shooting information and the image data not having the shooting information are classified into a plurality of image groups without distinction, and
wherein, in a case where the number of images of the image data having the shooting information is larger by at least a predetermined number than the number of images of the image data not having the shooting information, or in a case where a difference between the number of images of the image data having the shooting information and the number of images of the image data not having the shooting information is within a predetermined range, the image data having the shooting information are classified into a plurality of image groups and the image data not having the shooting information are added to one or more out of the plurality of image groups of the image data having the shooting information based on the image characteristic quantities.

25. The image allocation method according to claim 23, further comprising selecting either performing the classification into the image groups taking the shooting information into account or performing the classification into the image groups based on the image characteristic quantities,
wherein, in a case where the classification into the image groups is performed taking the shooting information into account, the plurality of image data are classified into the image groups after discrimination of the plurality of image data, and
wherein, in a case where the classification into the image groups is performed based on the image characteristic quantities, the plurality of image data are classified into the image groups without the discrimination of the plurality of image data.

26. The image allocation method according to claim 17, wherein the shooting information includes shooting date and time information or shooting order information.

* * * * *